United States Patent
Kappler et al.

(10) Patent No.: US 8,077,618 B2
(45) Date of Patent: Dec. 13, 2011

(54) USING BURST TOLERANCE VALUES IN TIME-BASED SCHEDULES

(75) Inventors: Christopher J. Kappler, Waltham, MA (US); Anna Charny, Sudbury, MA (US); Robert Olsen, Dublin, CA (US); Earl T. Cohen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1841 days.

(21) Appl. No.: 11/070,932

(22) Filed: Mar. 3, 2005

(65) Prior Publication Data

US 2006/0029080 A1    Feb. 9, 2006

Related U.S. Application Data

(63) Continuation-in-part of application No. 10/913,055, filed on Aug. 5, 2004.

(51) Int. Cl.
*H04L 12/26* (2006.01)
*H04L 12/28* (2006.01)
*H04L 12/56* (2006.01)

(52) U.S. Cl. .................................. 370/235; 370/395.4
(58) Field of Classification Search .................. None
See application file for complete search history.

(56) References Cited

U.S. PATENT DOCUMENTS

| | | | |
|---|---|---|---|
| 5,751,708 A | 5/1998 | Eng et al. | |
| 5,844,890 A * | 12/1998 | Delp et al. | 370/230 |
| 5,850,399 A | 12/1998 | Ganmukhi et al. | |
| 5,864,540 A | 1/1999 | Bonomi et al. | |
| 5,864,557 A | 1/1999 | Lyons | |
| 5,892,766 A | 4/1999 | Wicki et al. | |
| 6,064,650 A * | 5/2000 | Kappler et al. | 370/233 |
| 6,130,878 A | 10/2000 | Charny | |
| 6,337,851 B1 | 1/2002 | Charny et al. | |
| 6,389,019 B1 * | 5/2002 | Fan et al. | 370/395.42 |
| 6,408,005 B1 | 6/2002 | Fan et al. | |
| 6,412,000 B1 | 6/2002 | Riddle et al. | |

(Continued)

OTHER PUBLICATIONS

H. Jonathan Chao, Y. Jeng, X. Guo, C. Lam; "Design of Packet-Fair Queuing Schedulers Using a RAM-Based Searching Engine"; IEEE Journal of Selected Areas in Communications, vol. 17, No. 6, Jun. 1999, pp. 1105-1126.*

(Continued)

*Primary Examiner* — Gregory Sefcheck
*Assistant Examiner* — Suk Jin Kang
(74) *Attorney, Agent, or Firm* — The Law Office of Kirk D. Williams

(57) ABSTRACT

Schedules may use burst tolerance values to adjust the scheduling in a time-based schedule, such as, but not limited to, adjusting for accumulated but not used bandwidth, and/or adjusting eligibility of schedule entries. A best schedule item associated with an eligible schedule entry of a schedule is identified. Whether or not a particular schedule entry is eligible is typically determined based on the relationship of an associated timestamp with a current scheduling time, such as its timestamp being less than or equal to the current time. A burst tolerance time bound might also be used to allow certain priorities and/or types of items to be considered eligible if even its timestamp exceeds the current time by an amount, but less than or equal to the burst tolerance time bound. When a schedule entry which has been dormant becomes active, its one or more timestamps are typically initialized, which may include setting at least one of these timestamps behind current time by a wakeup burst tolerance value to guarantee its immediate eligibility for one or more consecutive scheduling iterations.

46 Claims, 15 Drawing Sheets

U.S. PATENT DOCUMENTS

| | | | |
|---|---|---|---|
| 6,438,134 | B1 | 8/2002 | Chow et al. |
| 6,449,650 | B1 | 9/2002 | Westfall et al. |
| 6,469,982 | B1 * | 10/2002 | Henrion et al. ............... 370/230 |
| 6,477,168 | B1 * | 11/2002 | Delp et al. ................. 370/395.4 |
| 6,483,839 | B1 | 11/2002 | Gemar et al. |
| 6,532,213 | B1 * | 3/2003 | Chiussi et al. ............. 370/230.1 |
| 6,560,230 | B1 | 5/2003 | Li et al. |
| 6,643,293 | B1 | 11/2003 | Carr et al. |
| 6,691,312 | B1 | 2/2004 | Sen et al. |
| 6,836,475 | B2 | 12/2004 | Chaskar et al. |
| 6,876,952 | B1 * | 4/2005 | Kappler et al. ............... 702/187 |
| 7,190,674 | B2 * | 3/2007 | Kobayakawa et al. ........ 370/235 |
| 2001/0001608 | A1 | 5/2001 | Parruck et al. |
| 2003/0050954 | A1 * | 3/2003 | Tayyar et al. ................. 709/102 |
| 2003/0123449 | A1 | 7/2003 | Kuhl et al. |
| 2003/0142692 | A1 * | 7/2003 | Shimada ...................... 370/442 |
| 2003/0202517 | A1 * | 10/2003 | Kobayakawa et al. ..... 370/395.4 |
| 2004/0177087 | A1 | 9/2004 | Wu et al. |
| 2004/0184460 | A1 * | 9/2004 | Milway et al. ............. 370/395.1 |
| 2005/0243853 | A1 | 11/2005 | Bitar et al. |
| 2005/0249220 | A1 | 11/2005 | Olsen et al. |

OTHER PUBLICATIONS

J. Bennett, H. Zhang, "Hierarchical Packet Fair Queuing Algorithms", IEEE/ACM Transactions on Networking, vol. 5, No. 5, Oct. 1997.*

U.S. Appl. No. 10/758,547, filed Jan. 14, 2004, Charny et al.

U.S. Appl. No. 10/422,167, filed Apr. 24, 2003, Kappler et al.

U.S. Appl. No. 11/022,246, filed Dec. 23, 2004, Cohen et al.

U.S. Appl. No. 10/913,055, filed Aug. 5, 2004, Cohen et al.

U.S. Appl. No. 11/022,220, filed Dec. 23, 2004, Shoham et al.

Bennett et al., "Hierarchical Packet Fair Queueing Algorithms," IEEE/ACM Transactions on Networking (TON), vol. 5, Issue 5, Oct. 1997, pp. 675-689.

Hou et al., "Service Disciplines for Guaranteed Performance Service," Proceedings—Fourth International Workshop on Real-Time Computing Systems and Applications, Oct. 27-29, 1997, pp. 244-250, Taipei.

Hagai et al., "Multiple Priority, Per Flow, Dual GCRA Rate Controller for ATM Switches," Electrical and Electronic Engineers in Israel, 2000. The 21st IEEE Convention, Apr. 11-12, 2000, pp. 479-482, Tel-Aviv, Israel.

Kim et al., "Three-level Traffic Shaper and its Application to Source Clock Frequency Recovery for VBR Services in ATM Networks," IEEE/ACM Transaction on Networking (TON), vol. 3, Issue 4, Aug. 1995, pp. 450-458.

Dixit et al., "Traffic Descriptor Mapping and Traffic Control for Frame Relay Over ATM Network," IEEE/ACM Transactions on Networking (TON), vol. 6, Issue 1, Feb. 1998, pp. 56-70.

Bennett et al., "WF$^2$Q: Worst-case Fair Weighted Fair Queueing," INFOCOM '96. Fifteenth Annual Joint Conference of the IEEE Computer Societies Networking the Next Generation. Proceedings IEEE. Mar. 24-28, 1996, vol. 1, pp. 120-128.

Bennett et al., "High-Speed, Scalable, and Accurate Implementation of Fair Queueing Algorithms in ATM Networks," ICNP '97, http://www-2.cs.cmu.edu/~hzhang/papers/ICNP97.pdf, 1997.

"Modular QoS CLI (MQC) Three-Level Hierarchical Policer", Cisco Systems, Inc., San Jose, CA, Oct. 1, 2004.

A. Ioannou & M. Katevenis, Pipelined Heap (Priority Queue) Management for Advanced Scheduling in High-Speed Networks, 2001, IEEE, 0-7803-7097, pp. 2043-2047.

* cited by examiner

USING BURST TOLERANCE VALUES IN TIME-BASED SCHEDULES

CROSS-REFERENCE TO RELATED APPLICATIONS

This is a continuation-in-part of U.S. patent application Ser. No. 10/913,055, filed Aug. 5, 2004, with the complete disclosure of this application being hereby incorporated by reference.

TECHNICAL FIELD

One embodiment of the invention relates to communications and computer systems, especially routers, packet switching systems, and other devices; and more particularly, one embodiment relates to using burst tolerance values to adjust the scheduling in a time-based schedule, such as, but not limited to, adjusting for accumulated but not used bandwidth, and/or adjusting eligibility of schedule entries.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet. For example, an enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

When there is a contention for resources, such as on output links of a packet switching system or interface or even for compute cycles in a computing device, it is important for resources to be allocated or scheduled according to some priority and/or fairness policy. Moreover, the amount of work required to schedule and to enqueue and dequeue a packet or other schedule item is important, especially as the operating rate of systems increase. Many different mechanisms have been used by an individual schedule to schedule packets, many of which are described hereinafter.

Ordinary time division multiplexing (TDM) is a method commonly used for sharing a common resource between several clients. All scheduled clients are served one at a time at predetermined times and for pre-allocated time periods, which is a very useful property for many applications. This method is often used for multiplexing multiple synchronous items over a higher speed communications link, such as that used for multiplexing multiple telephone calls over a single facility or interleaving packets. However, in a dynamic environment wherein items may not require the full amount of their allocated time slot such as when an item may only require none or only a portion of a particular allocated time slot, then bandwidth of the resource is typically wasted.

Ordinary round-robin (RR) is another method commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly. For example, certain higher priority or larger bandwidth ports or streams of packets may not get their desired amount of bandwidth, which may especially be the case when serving one large and numerous smaller traffic streams or when different priorities of traffic are scheduled.

In some scenarios, high priority (e.g., low latency), guaranteed bandwidth, best effort traffic (e.g., spare bandwidth) and other classifications of traffic compete for a common resource. Various known scheduling methods are designed to provide isolation, prioritization, and fair bandwidth allocation to traffic competing for a common resource. These are known as fair queuing methods. Some examples are Weighted Fair Queuing (WFQ), Self-Clocked Fair Queuing (SCFQ), and Deficit Round Robin/Surplus Round Robin (referred to as DRR).

WFQ and SCFQ depend upon arrival times as well as previous link utilization in order to calculate the next best packet to send. The accepted "ideal" behavior is bit-by-bit or weighted bit-by-bit round robin which assigns each bit of each packet in the system an ideal finish time according to the weighted fair sharing of the system. This is typically not practical in a packet-based system unless all packets are one bit. Generalizing the algorithm from bit-by-bit to packet-by-packet, each packet is assigned an ideal finish (departure) time and the packets are served in order of the earliest departure time. The inclusion of theoretical departure times in a scheduling method typically requires insertion into a sorted list which is known to be an O(log N) problem implemented in software, where N is typically the number of queues. In hardware, this problem may be reduced to an O(1) operation with O(log N) resources.

DRR is a method used for sharing a common resource between several clients with different ratios between clients (i.e., some clients are allowed to consume more of the resources than others). The ratio between clients is typically defined by a parameter called a quantum. There are many variations and different implementations of DRR, including that described hereinafter.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will consume an equal amount of bandwidth.

This DRR approach works in rounds, where a round is one round-robin iteration over the queues that have items to be sent. Typically, when the queue is scheduled, it is allowed to transmit until its deficit becomes negative (or non-positive), and then the next queue is served. Packets coming in on different flows are stored in different queues. Each round, each queue is allocated a quantum worth of bytes, which are added to the deficit of each queue. Each queue is allowed to send out one or more packets in a DRR round, with the exact number of packets being sent in a round being dependent on its quantum and the size of the packets being sent. Typically, as long as the deficit is a positive (or non-negative) value (i.e., it is authorized to send a packet) in a DRR round for a queue and it has one or more packets to send, a packet is sent and its deficit is reduced based on the size of the sent packet. If there are no more packets in a queue after the queue has been serviced, one implementation sets the deficit corresponding to the queue to zero, while one implementation does this only if its deficit is negative. Otherwise, the remaining amount (i.e., the deficit minus the number of bytes sent) is maintained for the next DRR round.

DRR has a complexity of O(1)—that is the amount of work required is a constant and independent of the number of packets enqueued. In order to be work conserving, a packet should be sent every time a queue is scheduled no matter its size. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal." In particular, latency for a system with N queues is Q*N where Q is the average quantum, which must be at least one maximum transmission unit (MTU).

Different prior scheduling algorithms use a single schedule entry for scheduling multiple traffic rates using multiple deficits (e.g., token buckets). However, each of these multiple deficits must be updated for each packet scheduled, which can be a significant amount of work and is not scalable to meet the needs of large systems. Additionally, a prior system provides an initial amount of deficit to a schedule entry when it has been idle for some time period, with this initial amount typically being the maximum amount allowed for a deficit (e.g., the maximum number of tokens allowed in a corresponding token bucket). Also, Generic Cell Rate Algorithm (GCRA) may allow a single burst tolerance to be associated with a schedule entry to allow it to be eligible even if its timestamp exceeds the current time. However, none of these approaches provides a compressive and scalable solution for shaping scheduling traffic to achieve certain desired complex results.

SUMMARY

Disclosed are, inter alia, methods, apparatus, data structures, computer-readable media, and mechanisms, which may use burst tolerance values to adjust the scheduling in a time-based schedule, such as, but not limited to, adjusting for accumulated but not used bandwidth, and/or adjusting eligibility of schedule entries. One embodiment identifies a best schedule item associated with an eligible schedule entry of a schedule. Whether or not a particular schedule entry is eligible is typically determined based on the relationship of its associated timestamp with a current scheduling time, such as its timestamp being less than or equal to the current time. A burst tolerance time bound might also be used to allow certain priorities and/or types of items to be considered eligible even if their timestamp exceeds the current time by an amount, but less than or equal to the burst tolerance time bound. The best schedule item is processed and one or more timestamps associated with its schedule entry are updated. In one embodiment, when a schedule entry which has been dormant becomes active, its one or more timestamps are initialized, which may include setting at least one of these timestamps behind current time by a wakeup burst tolerance value to guarantee its immediate eligibility for one or more consecutive scheduling iterations.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
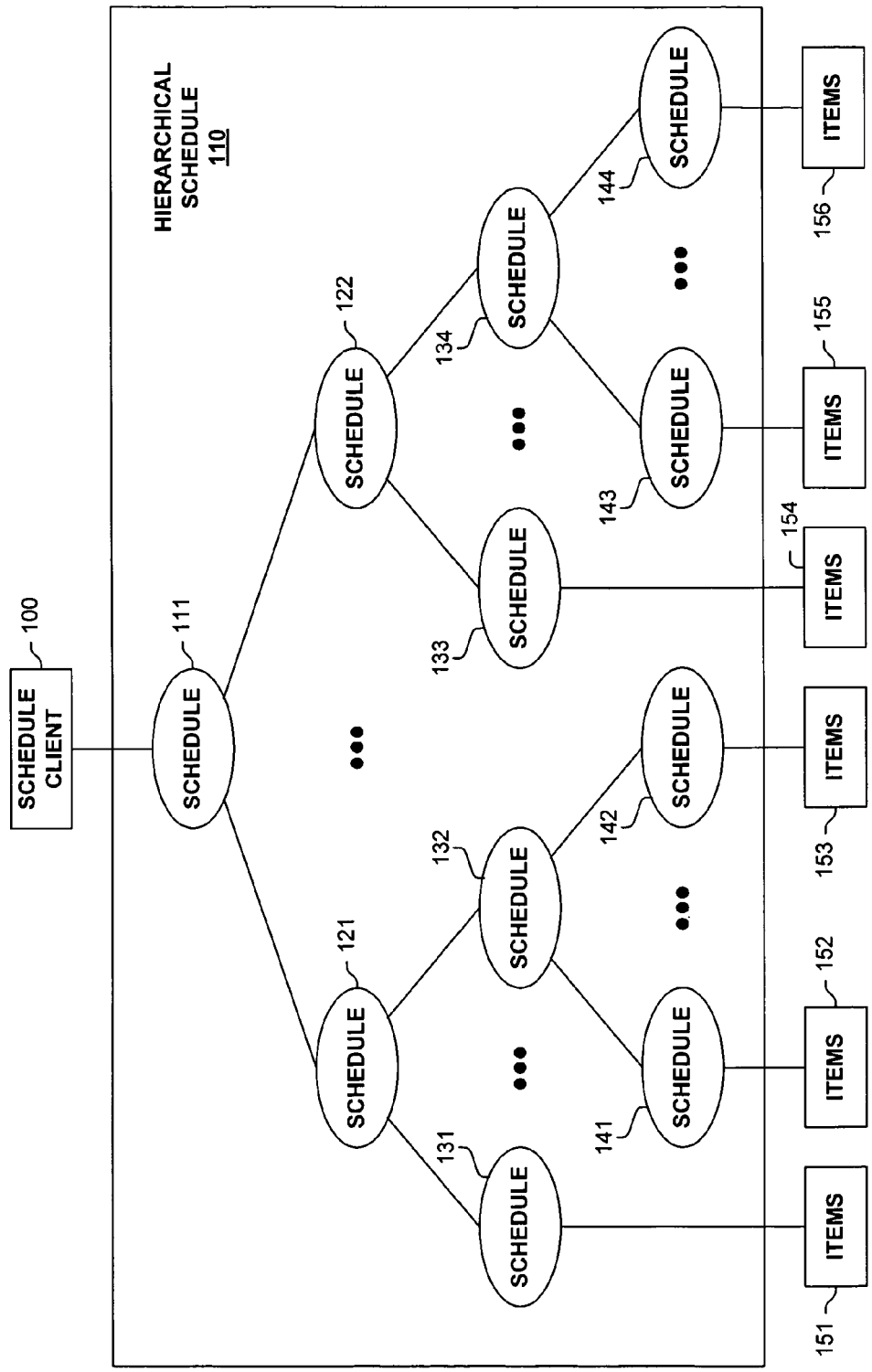
FIG. 1A is a block diagram of an exemplary hierarchical schedule used in one embodiment.

Disclosed are, inter alia, methods, apparatus, data structures, computer-readable media, and mechanisms, which may use burst tolerance values to adjust the scheduling in a time-based schedule, such as, but not limited to, adjusting for accumulated but not used bandwidth, and/or adjusting eligibility of schedule entries.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, which may use burst tolerance values to adjust the scheduling in a time-based schedule, such as, but not limited to, adjusting for accumulated but not used bandwidth, and/or adjusting eligibility of schedule entries. FIGS. 5A-E illustrate, using scheduling timelines (500, 510, 520, 530 and 540), a few of various burst tolerance values that may be used by an embodiment, and FIG. 5F illustrates one example of how some of these burst tolerance values may effect the rate at which a schedule entry is serviced. In one embodiment, a single schedule may simultaneously apply multiple burst tolerances to a single timestamp of each entry.

Figure 5A:
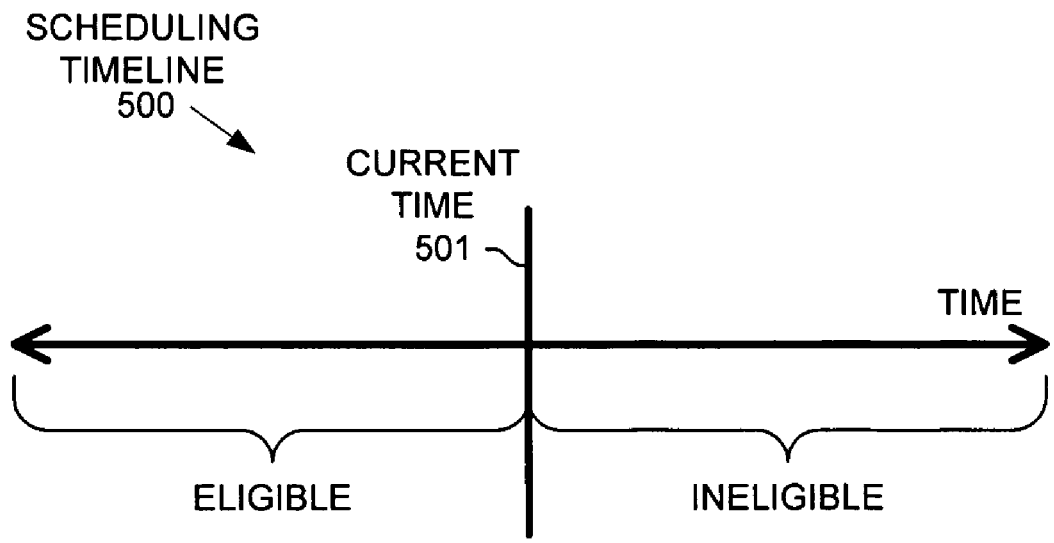
FIGS. 5A-E are block diagrams illustrating some burst tolerance values used in one embodiment.

Turning first to FIG. 5A, shown is a scheduling timeline 500, which depicts that a schedule entry is eligible for servicing if its timestamp is before current time 501, and ineligible if its timestamp is after current time 501. Depending on the embodiment, a schedule entry may be eligible or ineligible if its timestamp is equal to current time 501.

Figure 5B:
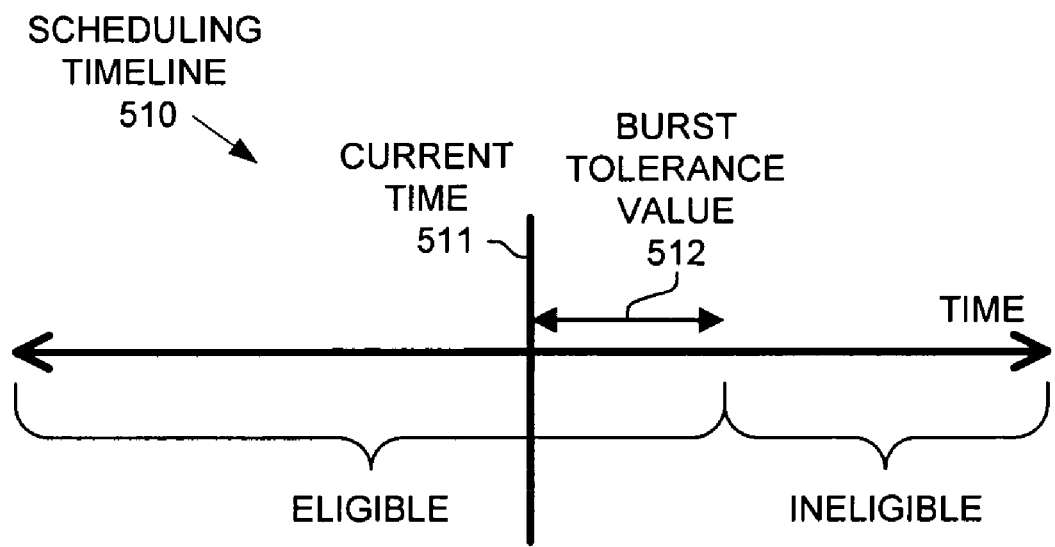

FIG. 5B illustrates a use in one embodiment of a burst tolerance value, such as one associated with a priority or type of traffic, which allows a schedule entry to be considered eligible for servicing even if its timestamp is beyond current time 511, but is within a burst tolerance range defined by burst tolerance value 512. Different priorities and/or different types of traffic may be associated with a same or different burst tolerance value 512. For example, high priority traffic associated with a schedule entry may be associated with a burst tolerance value greater than zero, such that normally traffic associated with the schedule entry can be serviced at one rate (e.g., a guaranteed minimum scheduling rate), but allows for low-latency servicing of the high priority item. For example, assuming that traffic is being sent at the minimum guaranteed scheduling rate, then the schedule entry's timestamp will typically be around the current timestamp. When a high priority item becomes associated with the schedule entry, the high priority burst tolerance value provides a time bound amount which can be selected to allow the high priority item to be eligible immediately for servicing, rather than waiting for the next scheduling time for the normal traffic. Thus, a same timestamp can be used to schedule other types of traffic in addition to high priority traffic. Also, using a high priority burst tolerance value and updating the timestamp of the schedule entry for scheduled high priority items (rather than allowing them to be freely scheduled) provides a cap on the amount of traffic including high priority traffic that can be scheduled using a schedule entry. One embodiment may use multiple burst tolerance values, such as associating each of the multiple burst tolerance values with one or more types and/or priorities of traffic.

Figure 5C:
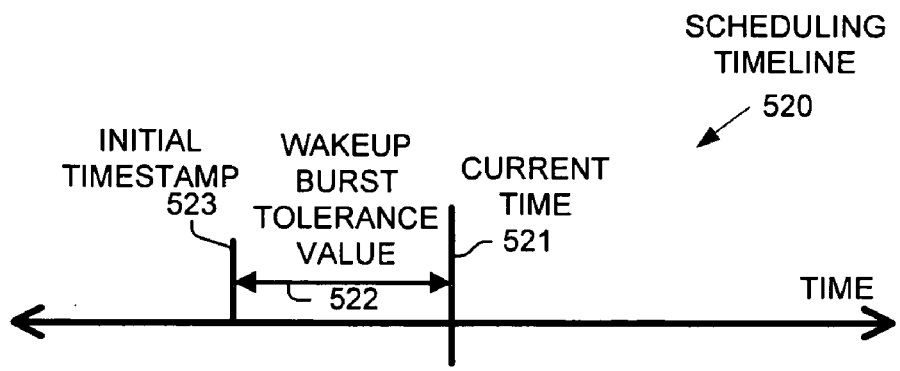

FIG. 5C illustrates an example of a wakeup burst tolerance. When a dormant schedule entry (e.g., one that is inactive because it has become empty—there are no packets waiting for service) becomes active again, the schedule entries timestamp may be set to a value based on a wakeup burst tolerance value 522, such as by setting this timestamp to the current time 521 minus the wakeup burst tolerance value 522, which may provide such a schedule entry some initial "extra" servicing.

Figure 5D:
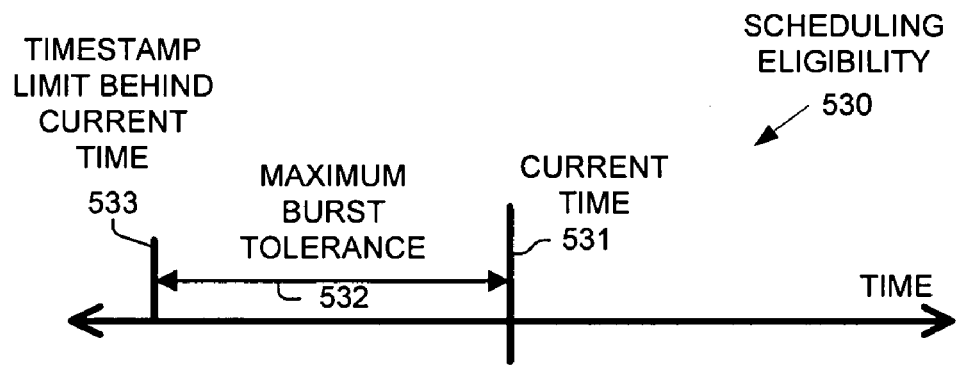

FIG. 5D illustrates an example of a maximum burst tolerance, which may be used to limit the maximum burst allowed for a schedule entry. As shown, by only allowing a schedule entry's timestamp 533 to be behind current time 531 by a maximum burst tolerance amount 532, a schedule entry cannot acquire so much unused scheduling time that it can completely consume all of the available scheduling time. In other words, it can be used to enforce a use it or lose it scheduling strategy for that scheduling time, while still providing an acquired burst amount defined by maximum burst tolerance amount 532.

Figure 5E:
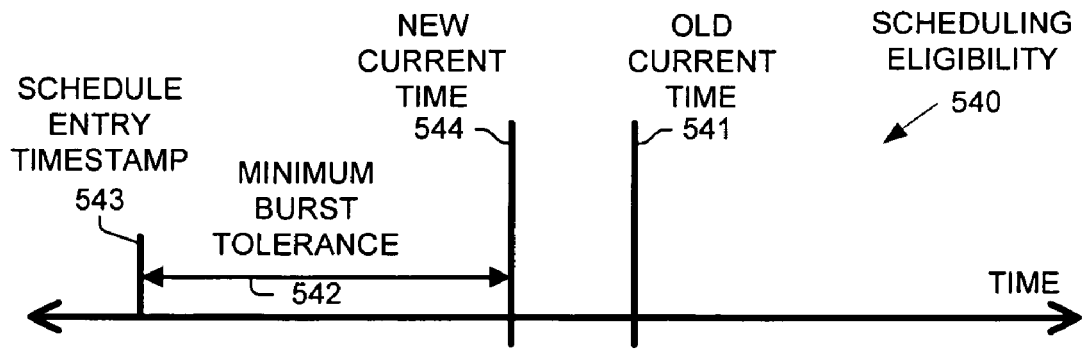
Figure 5F:
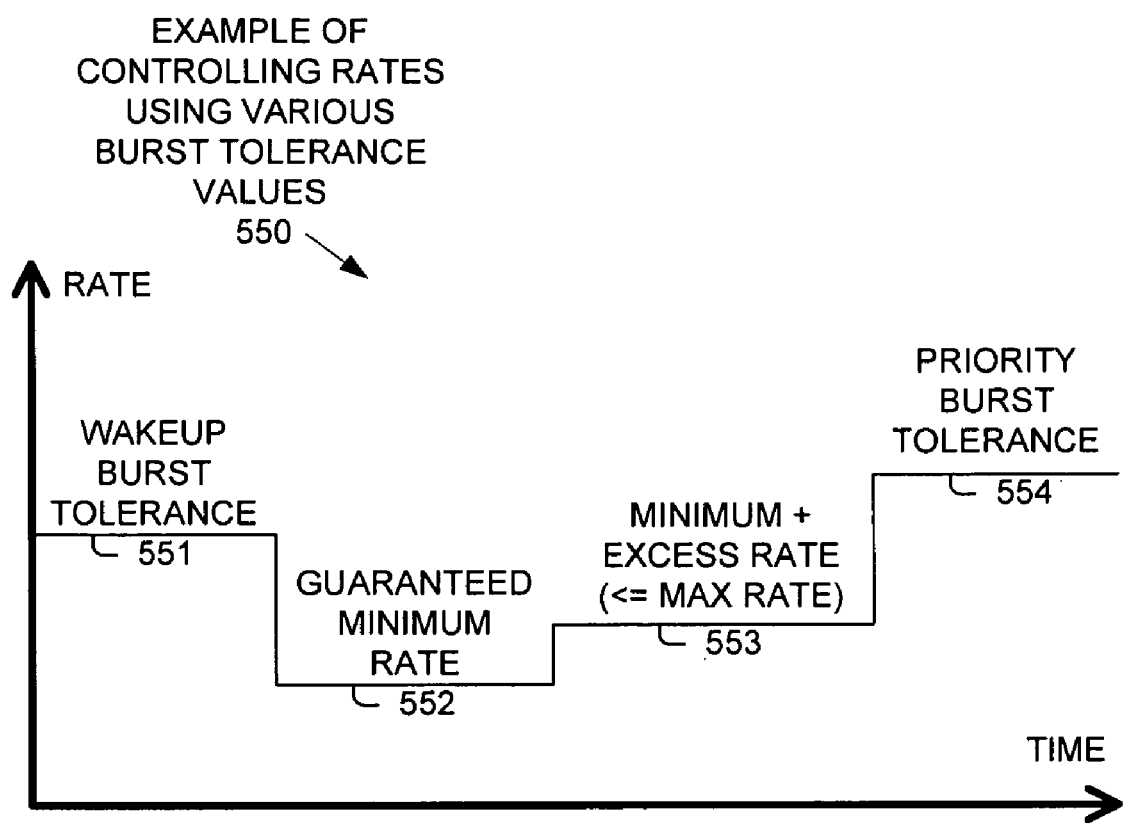
FIG. 5F is a block diagram illustrating how various burst tolerance values can be used to control the service rate of a schedule entry.

FIG. 5E illustrates an example of a minimum burst tolerance, which may be especially useful when the minimum guaranteed scheduling rates are oversubscribed (e.g., they cannot all be service at their desired rates). Thus, current time 541 will advance faster than the timestamps associated with these schedule entries. To compensate, one embodiment "slips"/effectively backwards adjusts old current time 541 to new current time 544 so it does not drift too far (e.g., beyond minimum burst tolerance 542) in advance of a schedule entry's timestamp 543. One mechanism for slipping time values is described in Kappler et al., "Methods and Apparatus for Maintaining Queues," U.S. patent application Ser. No. 10/426,438, filed Apr. 30, 2003, with the complete disclosure of this application being hereby incorporated by reference.

FIG. 5F illustrates one example 550 of how various burst tolerance values can be used to control the service rate of a schedule entry. When an entry becomes active, a wakeup burst tolerance value may allow a schedule entry to initially consume a higher rate 551 than that provided for by its guaranteed scheduling rate 552, the rate at which the schedule entry will be scheduled after the initial wakeup burst tolerance amount is consumed. If there is some available scheduling time after all scheduling entries receive their respective guaranteed minimum scheduling rates, then a schedule entry may additionally receive some excess rate scheduling 553, which may be capped by a maximum scheduling rate. If a high priority item becomes associated with the schedule entry, then it may also receive a higher scheduling rate 554 based on its priority burst tolerance. This example 550 is just one scenario of an unlimited number of various scheduling scenarios which can be achieved in one embodiment by associating one or more burst tolerance values with a schedule entry. In one embodiment, a single schedule may simultaneously apply multiple burst tolerances to a single timestamp of each entry.

For example, one embodiment identifies a best schedule item associated with an eligible schedule entry of a schedule. Whether or not a particular schedule entry is eligible is typically determined based on the relationship of its associated timestamp with a current scheduling time, such as its timestamp being less than or equal to the current time. A burst tolerance time bound might also be used to allow certain priorities and/or types of items to be considered eligible even if their timestamp exceeds the current time by an amount, but less than or equal to the burst tolerance time bound. The best schedule item is processed and one or more timestamps associated with its schedule entry are updated. In one embodiment, when a schedule entry which has been dormant becomes active, its one or more timestamps are initialized, which may include setting at least one of these timestamps behind current time by a wakeup burst tolerance value to guarantee its immediate eligibility for one or more consecutive scheduling iterations.

For example, schedule entries might be scheduled at guaranteed minimum scheduling rates. If this rate has been already serviced for a particular schedule entry, then there will be some time delay until the schedule entry becomes eligible to be serviced again. This could delay the servicing of a priority item associated with the schedule entry. By associating a burst tolerance time bound with, for example, priority items, then if a schedule entry has a priority item in this scenario, the burst tolerance time bound could allow the schedule entry to be immediately eligible, where otherwise (e.g., for servicing other types of items) it would not be eligible for some delay period.

Similarly, if a schedule entry scheduled at a guaranteed minimum scheduling rate has no items associated with it, the schedule entry will not be serviced. By initializing a dormant schedule entry when it becomes active again, the scheduling values associated with the schedule entry typically do not need to be updated during its dormancy. Also, by initializing one or more timestamps associated with the dormant schedule entry behind current time by some wakeup burst tolerance value, then the schedule entry will possibly be immediately eligible for multiple consecutive scheduling iterations (e.g., depending on the wakeup burst tolerance value, a rate associated with the schedule entry, and the amount of servicing of items associated with the schedule entry). Thus, in one embodiment, this mechanism provides compensation for periods of inactivity. In one embodiment, the wakeup burst tolerance value is a fixed value, possibly selected based on a priority and/or type of traffic associated with a schedule entry. In one embodiment, the wakeup burst tolerance value is a variable value (e.g., related to the term of the schedule entry's dormancy), possibly determined based on a priority and/or type of traffic associated with a schedule entry.

One embodiment schedules items in a schedule having multiple schedule entries. A best schedule item associated with an eligible schedule entry is identified (e.g., the highest priority item whose schedule entry has the earliest timestamp, or based on some other sorting criteria). Whether or not a particular schedule entry is eligible is determined based on the relationship of its associated timestamp with a current scheduling time, with this relationship including its associated timestamp being within a burst tolerance time bound after the current scheduling time (in addition to being less than or equal than the current scheduling time), with the burst tolerance time bound being a nonzero value associated with a priority level of an item currently associated with the particular schedule entry. In response to identifying the best schedule item, the timestamp associated with the schedule entry associated with the best schedule item is updated.

Embodiments may use different mechanisms for identifying the best schedule entry/item. For example, sorting trees, calendar schedules, searching mechanism, and/or other known or future developed mechanisms that can be used for scheduling. Also, one embodiment identifies and uses comparison values based on the timestamps and burst tolerance value(s), if any, associated with a schedule entry. For example, a comparison value might be an entry's timestamp, an entry's timestamp minus a corresponding burst tolerance value, etc.

One embodiment schedules items in a schedule having multiple schedule entries, with each of the schedule entries being associated with one or more timestamps, including a minimum guaranteed scheduling rate timestamp. Whether or not a particular schedule entry is eligible is determined based on the relationship of its associated minimum guaranteed scheduling rate timestamp with a current scheduling time, with this relationship including its associated minimum guaranteed scheduling rate timestamp being within a nonzero burst tolerance time bound after the current scheduling time but only if the particular schedule entry currently has associated therewith a high priority item (otherwise it must be less than or equal to the current time to be eligible). In one embodiment, each timestamp is not allowed to be more than a maximum burst tolerance amount behind the current scheduling time. In one embodiment, the current scheduling time is updated based on the timestamp of a schedule entry and a minimum burst tolerance value, which defines a maximum amount the current time can be ahead of the timestamp.

In one embodiment, in response to identifying the best schedule item, the minimum guaranteed scheduling rate timestamp associated with the schedule entry associated with the best schedule item is updated. In one embodiment, in response to identifying the best schedule item, the best schedule item is associated with a schedule entry of a parent schedule. In one embodiment, if the schedule entry was dormant prior to the associating operation, one or more timestamps associated with the schedule entry of the parent schedule are initialized. In one embodiment, at least one of the timestamps is set to prior to a current time by its corresponding nonzero wakeup burst tolerance value (and each timestamp may have its own, and possibly different, nonzero wakeup burst tolerance value associated therewith). In one embodiment, the wakeup burst tolerance value is identified based on a priority associated with the best schedule item.

In one embodiment, the best schedule item corresponds to the sending of a packet, and the updating the timestamp operation includes adjusting the timestamp by an amount corresponding to the size of the packet and a rate associated with the schedule entry. In one embodiment, multiple timestamps (including the timestamp and a maximum scheduling rate timestamp) are associated with the schedule entry associated with the best schedule item, which are updated in response to identifying the best schedule item.

In one embodiment, multiple timestamps (including the timestamp, a maximum scheduling rate timestamp, and an excess rate timestamp) are associated with the schedule entry associated with the best schedule item, some of which are selectively updated in response to identifying the best schedule item, with this updating possibly limited by a maximum burst tolerance value. For example, one embodiment updates the timestamp and the maximum rate timestamp in response to servicing a schedule entry. One embodiment also updates the excess rate timestamp in response to providing minimum guaranteed scheduling rate servicing. Also updating the excess rate timestamp has the effect of preventing (or at least delaying its excess rate servicing) this schedule entry from getting excess rate service unless the other entries are getting more excess rate service than the servicing provided by the guaranteed minimum scheduling rate. In one embodiment, the amount that the excess rate timestamp is updated in response to its minimum guaranteed scheduling rate servicing is limited by an amount (e.g., a burst tolerance value), so that its timestamp does not get ahead of the current virtual time by a maximum amount (e.g., to place a limit on the maximum time before it will be eligible to receive excess rate service).

One embodiment includes a single time-based schedule, which may use burst tolerance values to adjust its scheduling.

One embodiment includes multiple time-based schedules, which may use burst tolerance values to adjust their scheduling.

Also, one embodiment includes a hierarchy of individual schedules for scheduling items, such as, but not limited to packets or indications thereof, such that different classes of priority items can be propagated through the hierarchy of schedules accordingly. Note, herein are described many different embodiments and aspects thereof. Some of the aspects described may be global or local in nature. For example, an aspect may be the same for all schedules, only applicable to less than all schedules, or even only applicable to certain scheduling categories, scheduling lanes or for one or more connections from a child schedule to a parent schedule, etc. For ease of reader understanding, one embodiment is typically explained in the context of a hierarchy of schedules through which items propagate; however, the teachings of which are applicable to other embodiments in which information is distributed through the hierarchy of schedules and a search is performed through the hierarchy to identify the next schedule item to be forwarded (e.g., rather than actually propagating schedule items through the hierarchy of schedules), such as in, but not limited to a recursive descent approach and/or that described in U.S. patent application Ser. No. 10/758,547, filed Jan. 4, 2004, with the complete disclosure of which is hereby incorporated by reference. Typically, in the recursive descent approach, the items propagated through the hierarchical schedule are status indications (i.e., indicating the best item and/or available items).

FIG. 1A is a block diagram of an exemplary hierarchical schedule 110 used in one embodiment. As illustrated, items 151-156 are received by hierarchical schedule 110 and are propagated through one or more schedules 121-144 to reach schedule 111 and then forwarded to the schedule client 100. Schedule 111 is sometimes referred to as the root schedule as it corresponds the root of a tree formed by schedules 121-144. Each of the schedules 111-144 schedules traffic independently (although minimum guaranteed rates may be propagated from one or more child schedules/schedule entries to their parents), which typically includes scheduling traffic of two or more different scheduling categories, such as, but not limited to, high-priority traffic, low-priority traffic, rate-based traffic, propagated minimum guaranteed rate traffic. By providing multiple scheduling lanes or another mechanism for direct access to different categories of traffic, items of a higher priority can propagate through hierarchical schedule 110 without being blocked by or otherwise delayed behind lower priority traffic. Note, each schedule typically has a single parent schedule with one or more schedule entries or an external client, and one or more child schedules and/or external sources for items. The number of schedules and their arrangement in an embodiment using a hierarchical schedule is typically determined based on the needs of the application of the embodiment.

One embodiment includes a hierarchical schedule for use in scheduling items of multiple different scheduling categories, including a propagated minimum guaranteed scheduling rate category and a rate based category. The hierarchical schedule includes a parent schedule and multiple child schedules. The parent schedule includes multiple schedule entries and a scheduling mechanism, with each of the schedule entries corresponding to a different one of the child schedules and the scheduling mechanism being configured to identify a best schedule item from the schedule entries. Items of the propagated minimum guaranteed scheduling rate category and items of the rate based category share a common minimum guaranteed rate in each of the plurality of schedule entries; and wherein items corresponding to the propagated minimum guaranteed scheduling rate category associated with a particular schedule entry of the plurality of schedule entries are scheduled before items corresponding to the rate based category associated with the particular schedule entry.

In one embodiment, items of the propagated minimum guaranteed scheduling rate category and items of the rate based category share a common maximum rate in each of the plurality of schedule entries. In one embodiment, the different scheduling categories include a priority scheduling category; and items corresponding to the priority scheduling category associated with the particular schedule entry are scheduled before items corresponding to the propagated minimum guaranteed scheduling rate and rate based scheduling categories. In one embodiment, the scheduling categories include a priority scheduling category, and items corresponding to the priority scheduling category are scheduled before items corresponding to the propagated minimum guaranteed scheduling rate and rate based scheduling categories.

Figure 1B:
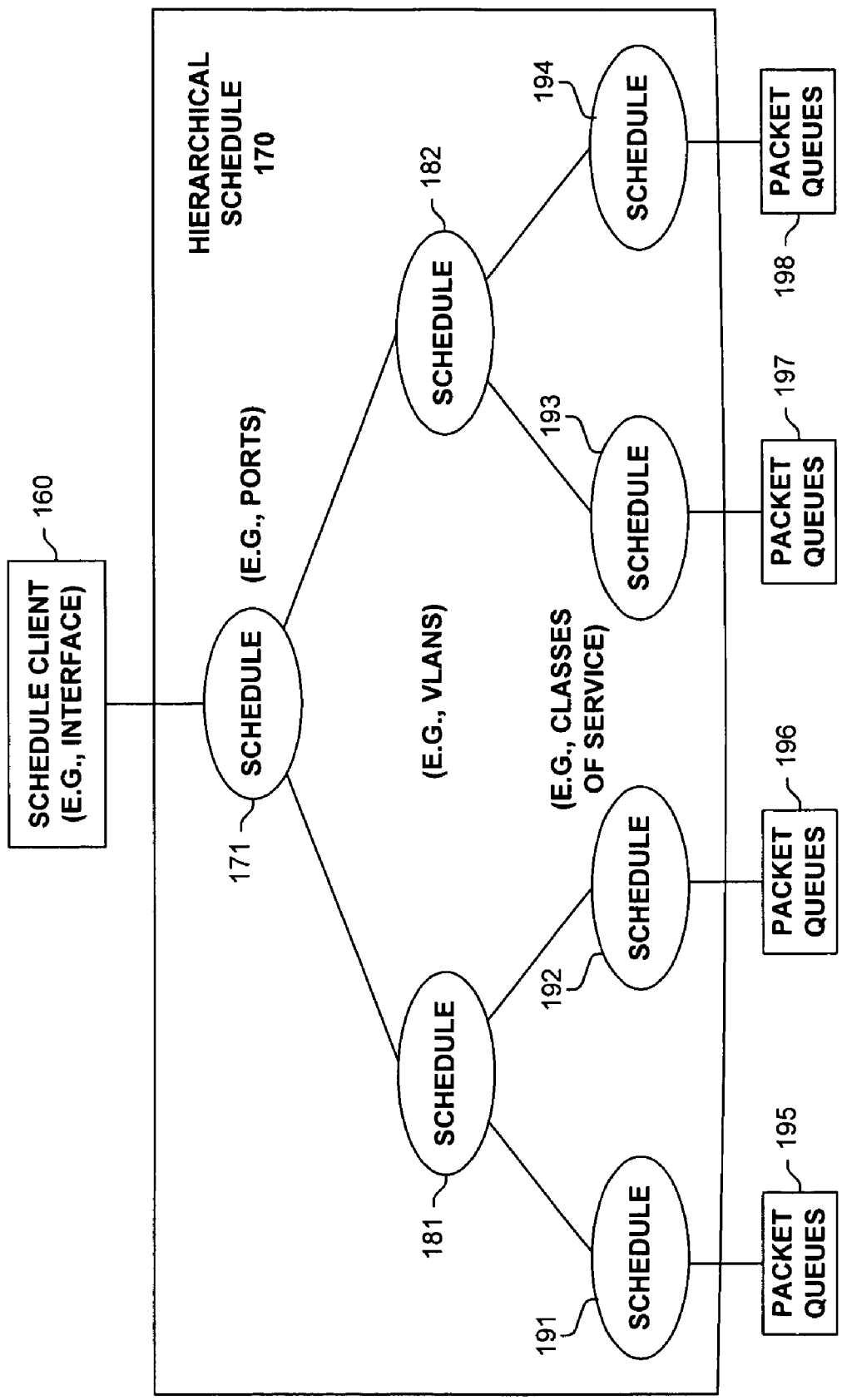
FIG. 1B is a block diagram of an exemplary hierarchical schedule used in one embodiment.

FIG. 1B illustrates an example use of hierarchical schedule 170 in the context of items being packets or indications corresponding to packets. Note, one embodiment of a hierarchical schedule could be used for scheduling ingress and/or egress packet traffic. In the illustrated example, hierarchical schedule 170 is responsible for scheduling the sending of packets received from packet queues 195-198. Hierarchical schedule 170 accomplishes this using multiple scheduling layers: a class of service scheduling layer using schedules 191-194, with their parent schedules 181-182 corresponding to a VLAN scheduling layer, with their parent schedule 171 corresponding to a port schedule, which provides the packets or indications thereof to schedule client 160, corresponding to an interface.

Each of the schedules 171-194 schedules traffic independently, which typically includes two or more different scheduling categories, such as, but not limited to, high-priority traffic, low-priority traffic, rate-based traffic, propagated minimum guaranteed rate traffic. By providing multiple scheduling lanes or another mechanism for direct access to different categories of traffic, packets or indications thereof of a higher priority can propagate through hierarchical schedule 170 without being blocked by or waiting behind lower priority traffic. Note, each schedule typically has as its parent a single parent schedule entry of a parent schedule or an external client, and one or more child schedules and/or external sources for items. The number of schedules and schedule entries thereof, and their arrangement in an embodiment using a hierarchical schedule is typically determined based on the needs of the application of the embodiment. In one embodiment, a schedule has as its parent multiple schedule entries of a parent schedule, such as for, but not limited to, a schedule entry for each scheduling category—although the parent schedule entries will typically (but not in one embodiment) share one or more scheduling parameters, such as a maximum rate.

Figure 2A:
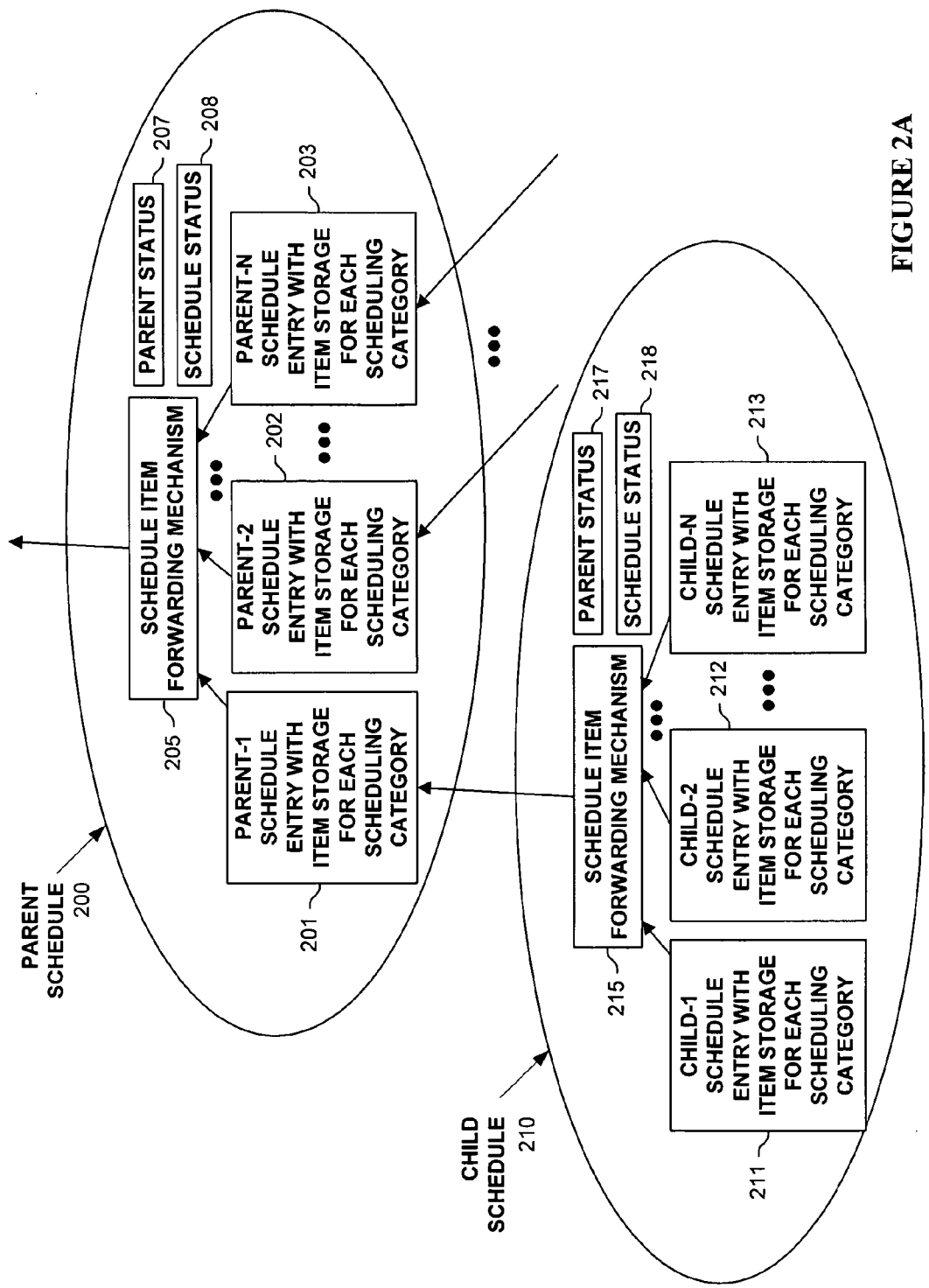
FIG. 2A is a block diagram illustrating a parent schedule and one of its child schedules used in one embodiment.

FIG. 2A illustrates the use of propagated minimum guaranteed scheduling rates in one embodiment. Illustrated are parent schedule 200 including schedule item forwarding mechanism 205 and schedule entries 201-203, each one typically corresponding to a child schedule (e.g., child schedule 210 and others not shown) with storage for items of each scheduling category, and child schedule 210 including schedule item forwarding mechanism 215 and schedule entries 211-213, each one typically corresponding to a child schedule (not shown) with storage for items of each scheduling category (e.g., high-priority traffic, low-priority traffic, rate-based traffic, propagated minimum guaranteed scheduling rate traffic, non-propagated minimum guaranteed scheduling rate traffic, or whatever categories match the needs of the application of the embodiment). By segregating the items by scheduling categories received from different child schedule entries, a schedule is able to propagate different types or priorities of traffic ahead of other traffic, even if such traffic was received earlier.

Based on the need of parent schedule 200, schedule item forwarding mechanism 215 of child schedule 210 selects and forwards a corresponding best item identified by one of its schedule entries 211-213, each of which have independently identified a next best item from all of their stored items of the various scheduling categories. Similarly, schedule item forwarding mechanism 205 of parent schedule 200 selects a corresponding best item identified by one of its schedule entries 201-203, each of which have independently identified a next best item from all of their stored items of the various scheduling categories.

One embodiment also maintains one or more data structures indicating the categories of traffic which it currently has stored, and those categories which its parent schedule has stored or needs from it. For example, parent schedule 200 maintains parent status information 207 and its schedule status information 208, and child schedule 210 maintains parent status information 217 (i.e., corresponding to parent schedule 200) and its schedule status information 218. In this manner, a child schedule can readily determine (e.g., based on a comparison of its maintained parent and own status information) which type of traffic it has available to forward to its parent schedule and which matches the needs of its parent schedule. In one embodiment, each schedule stores up to a single item of each category from each of its child schedules or external item sources, and uses one or more bitmaps to maintain this status information. In one embodiment, each schedule stores up to more than one item of each category from each of its child schedules or external item sources, and uses one or more sets of counters to maintain this status information. In one embodiment, each schedule includes multiple schedule entries, each associated with a unique child schedule or external source, and the schedule entries themselves contain storage for one or more items of each scheduling category. Note, in one embodiment, one or more scheduling categories are consolidated into fewer and/or a single scheduling category by a sending schedule and/or a receiving schedule.

Any type of scheduling mechanism (e.g., using a calendar schedule, DRR, or other scheduling mechanism) can be used to identify the best item from the items received from its child schedules or external sources. In one embodiment, each schedule entry is defined based configurable values, such as, but not limited to, a minimum guaranteed scheduling rate, a maximum scheduling rate, and a fair share weighted value (e.g., for using in scheduling excess rate service in a schedule).

Figure 2B:
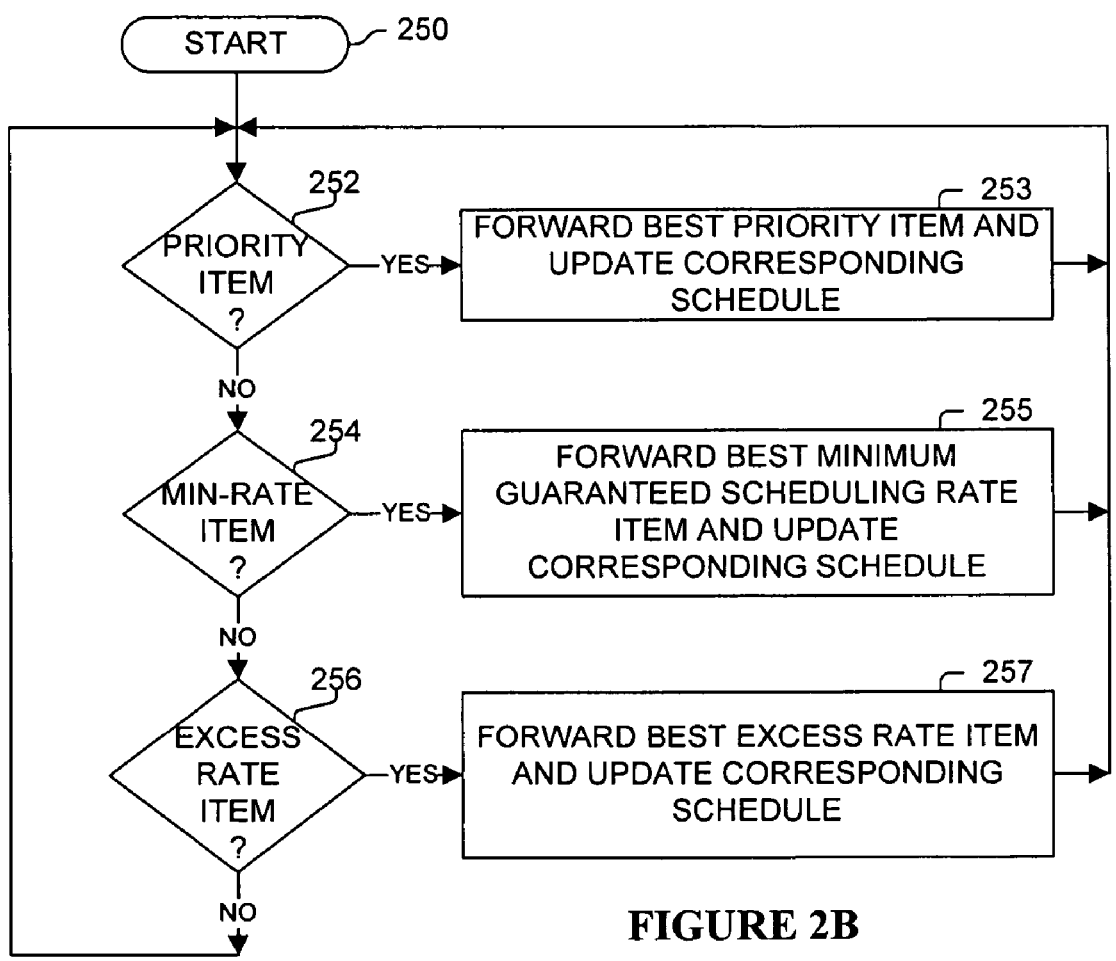
FIG. 2B is a flow diagram illustrating the selected scheduling of items from multiple scheduling classes performed in one embodiment.

FIG. 2B is a flow diagram illustrating a process used by a schedule in one embodiment for scheduling items from multiple scheduling classes, which include high-priority, (propagated and/or non-propagated) minimum guaranteed scheduling rate, and excess rate scheduling categories. Processing begins with process block 250. As determined in process block 252, if at least one priority item is available for forwarding, then in process block 253, a best priority item is selected, typically based on a fair arbitration process, and forwarded to its parent and the corresponding schedule is typically updated to reflect the forwarding of the item. Many scheduling mechanisms can be used, and one such mechanism for updating a schedule is disclosed in Cohen et al., "Rate Computations of Particular Use in Scheduling Activities or Items such as the Sending of Packets," U.S. patent application Ser. No. 10/777,607, filed Feb. 11, 2004, which is hereby incorporated by reference in its entirety.

Otherwise, as determined in process block 254, if at least one minimum guaranteed scheduling rate item is available for forwarding, then in process block 255, a best guaranteed minimum rate item is selected and forwarded to its parent and the corresponding schedule is typically updated to reflect the forwarding of the item. Otherwise, as determined in process block 256, if at least one excess rate item is available to be forwarded, then in process block 257, a best excess rate item is selected and forwarded to its parent and the corresponding schedule is typically updated to reflect the forwarding of the item. Processing returns to process block 252 to continue forwarding and scheduling more items.

Figure 3A:
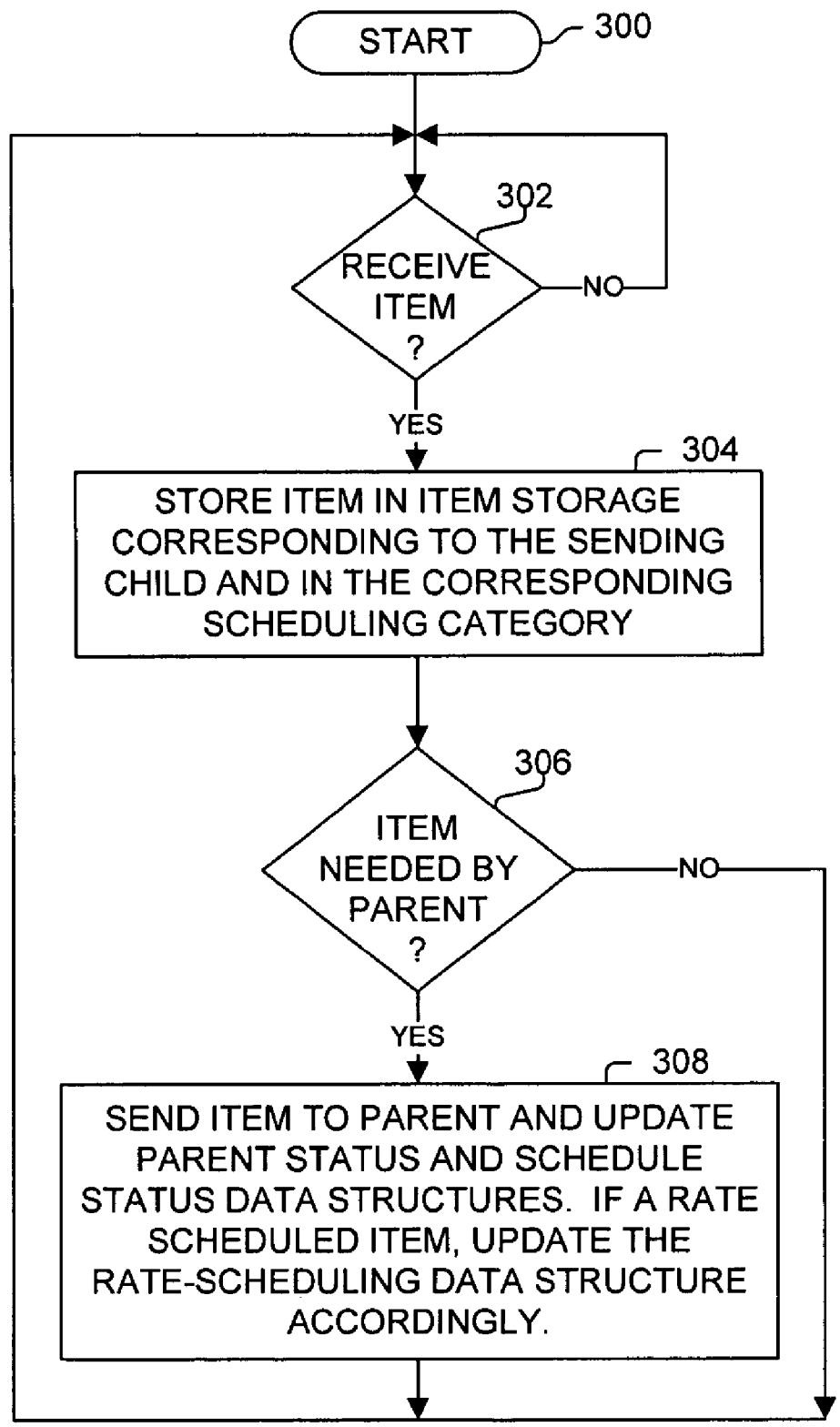
FIGS. 3A-C are flow diagrams of processes for propagating items through a hierarchical schedule in one embodiment.

FIG. 3A illustrates a process used in one embodiment for propagating items to a parent schedule entry of a parent schedule upon startup or in response to a previously unfulfilled request to this child schedule for an item of the particular scheduling category. Processing begins with process block 300. As determined in process block 302, if an item has been previously received, then in process block 304, the item is stored in the item storage corresponding to the sending child schedule or external source for the scheduling category. A determination is made in process block 306, whether or not the item of that scheduling category is needed by the parent schedule entry of the parent schedule. In one embodiment, this determination includes comparing the indications of items needed in its parent status data structure with indications of items that it has received from its child in its schedule status data structure.

It is common in packet routing and switching platforms to use third-party devices to perform the actual encoding of packets onto the physical media. These devices often create flow control information to feed back to the packet routing and switching engine. Applying scheduling in the packet engine makes this process run more smoothly, reducing overall delay for all types of traffic. Note, in one embodiment, items are not considered for forwarding (here and in regards to other forwarding decisions) if the propagation of its corresponding scheduling category has been halted due to a flow control or other mechanism.

The scheduler may perform real-time shaping of packets towards an egress channel in order to keep the channel smoothly utilized and to reduce the dependence of flow control. However, when a channel has both a priority and a non-priority FIFO, the scheduling must allow the shaped rate to be instantaneously exceeded in order to deliver priority traffic to the priority FIFO even if the non-priority FIFO was just serviced, making the entry ineligible.

The magnitude of the priority burst tolerance, when used for this purpose, may be configured to be less than or equal to the depth of the priority FIFO of the egress channel so that the channel shaping may still protect the egress FIFOs from over-run.

As determined in process block 306, if the item of that scheduling category is needed by the parent schedule entry of the parent schedule, then in process block 308, a corresponding item is sent to its parent and the parent status and schedule status data structures are updated. Also, if the item was a rate-based item, then the rate scheduling data structure is updated. In one embodiment, the determination made in process block 306 includes identifying that a parent schedule entry does not need an item of a particular scheduling category, even though it has storage space for the item of the particular scheduling category, if the parent schedule entry already has an item of a scheduling category with a higher scheduling priority than the scheduling priority of the particular scheduling category. Processing returns to process block 302.

Figure 3B:
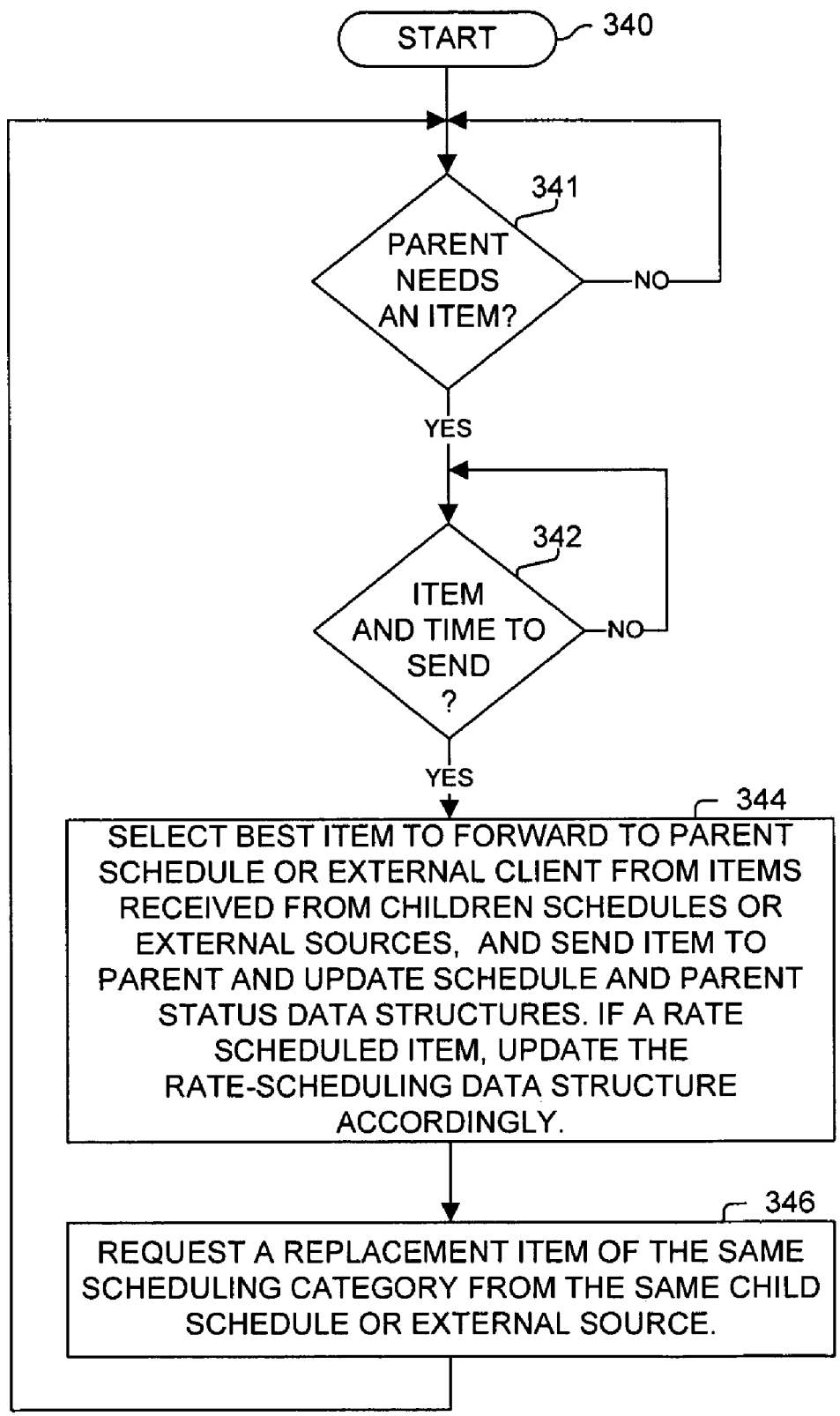

FIG. 3B illustrates a process used in one embodiment for scheduling items which have been received from its child schedules or external sources. Processing begins at process block 340. As indicated by process block 341, processing is delayed or prevented until the parent schedule entry of a parent schedule or client needs an item. Then, as determined in process block 342, if the schedule has an item to send (and it is time to send a next item in one embodiment), then in process block 344, a best item, typically of the highest priority scheduling category needed by the parent, to be forwarded to the parent schedule entry of a parent schedule or client is determined (or has been already determined), and this best item is sent. The schedule's parent status and schedule status data structures are updated accordingly. Also, if the item was a rate-based item, then the rate scheduling data structure is updated. It is possible that the propagation of an item to the parent schedule entry may cause an ineligible parent schedule entry to become eligible for scheduling based on a burst tolerance associated with the parent schedule entry, such as a wakeup burst tolerance or a priority burst tolerance (e.g., a high priority item is received which makes the schedule entry eligible based on its associated priority burst tolerance value).

Note, the hierarchical schedule allows different embodiment to use different scheduling mechanisms, while providing a mechanism to schedule traffic received from several child schedules or external sources and to allow higher priority traffic to be propagated through the hierarchy of schedules without having to wait behind lower priority traffic. Also note, in one embodiment, one or more scheduling categories are consolidated into fewer and/or a single scheduling category by a sending schedule and/or a receiving schedule.

In process block 346, a request for a replacement item is sent to the child schedule or external source from which the sent item was received, typically along with an indication of the traffic category from which the sent item belongs. Processing then returns to process block 341.

Figure 3C:
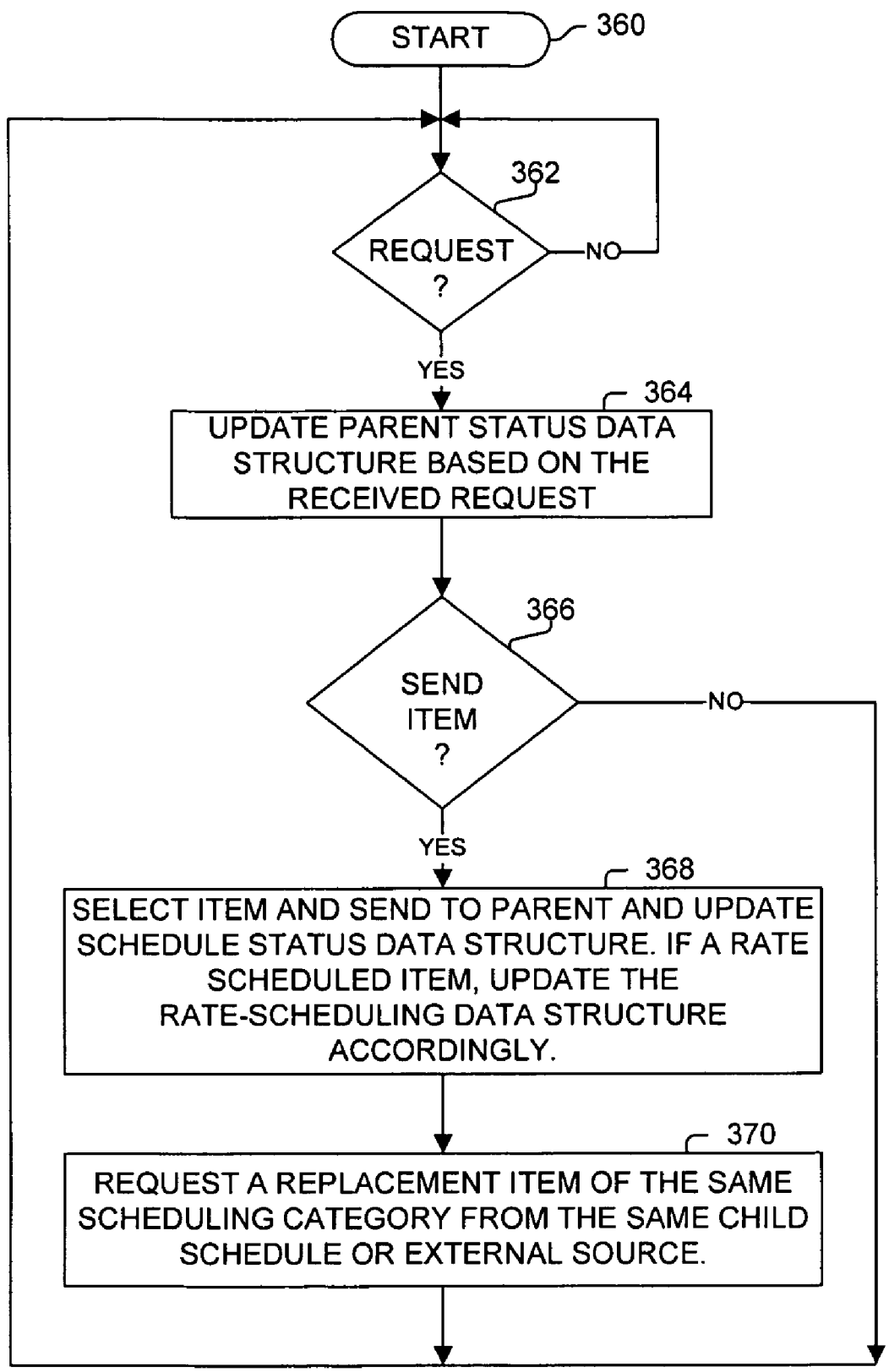

FIG. 3C illustrates a process used in one embodiment for propagating items to a parent schedule entry of a parent schedule in response to a request from the parent for an item of a particular scheduling category. Processing begins with process block 360. As determined in process block 362, if request has been received, then in process block 364, the parent data structure, which typically identifies the scheduling categories and possibly number of items for each that its parent needs, is updated based on the received request. In process block 366, a determination is made whether or not the schedule currently has an item to send to the parent schedule entry of a parent schedule or external client. In one embodiment, this determination is simply a check to see if it has an item of the scheduling category corresponding to the received request (e.g., by checking the item storage or schedule status data structure). In one embodiment, this determination will be forced to be false even if such an item is stored in the schedule if its parent schedule (or in one embodiment, more specifically its parent schedule entry of the parent schedule) is currently storing a higher priority item that it received from this schedule. In other words, until the schedule's state determines that the parent schedule (or in one embodiment, more specifically its parent schedule entry of the parent schedule) has no items of a higher priority, an item will not be forwarded to its parent schedule entry of the parent schedule. This will not delay the scheduling of the item as a parent schedule, in determining its next schedule item, will typically only consider items of the highest priority category received from its child. Thus, this lower priority item would not have been forwarded by the parent schedule anyway, and by delaying its propagation, a better item might be received or determined by this schedule in the mean time, and this approach might remove a race condition introduced by one implementation.

As determined in process block 366, if the schedule has an item to send to the parent, then in process block 368, a best item is selected from those items received from each of its child schedules or external sources, and the selected item is sent to the parent and the schedule status and parent status data structures are updated accordingly. In one embodiment, this item is always of the same scheduling category as that indicated in the received request. In one embodiment, this item is an item of the highest priority scheduling category needed by the parent. Also, if the item was a rate-based item, then the rate scheduling data structure is updated. In process block 370, a request for a replacement item of the same scheduling category as the item forwarded to the parent is sent to the child schedule or external source from which the item sent to the parent was received. Processing returns to process block 362.

Figure 4:
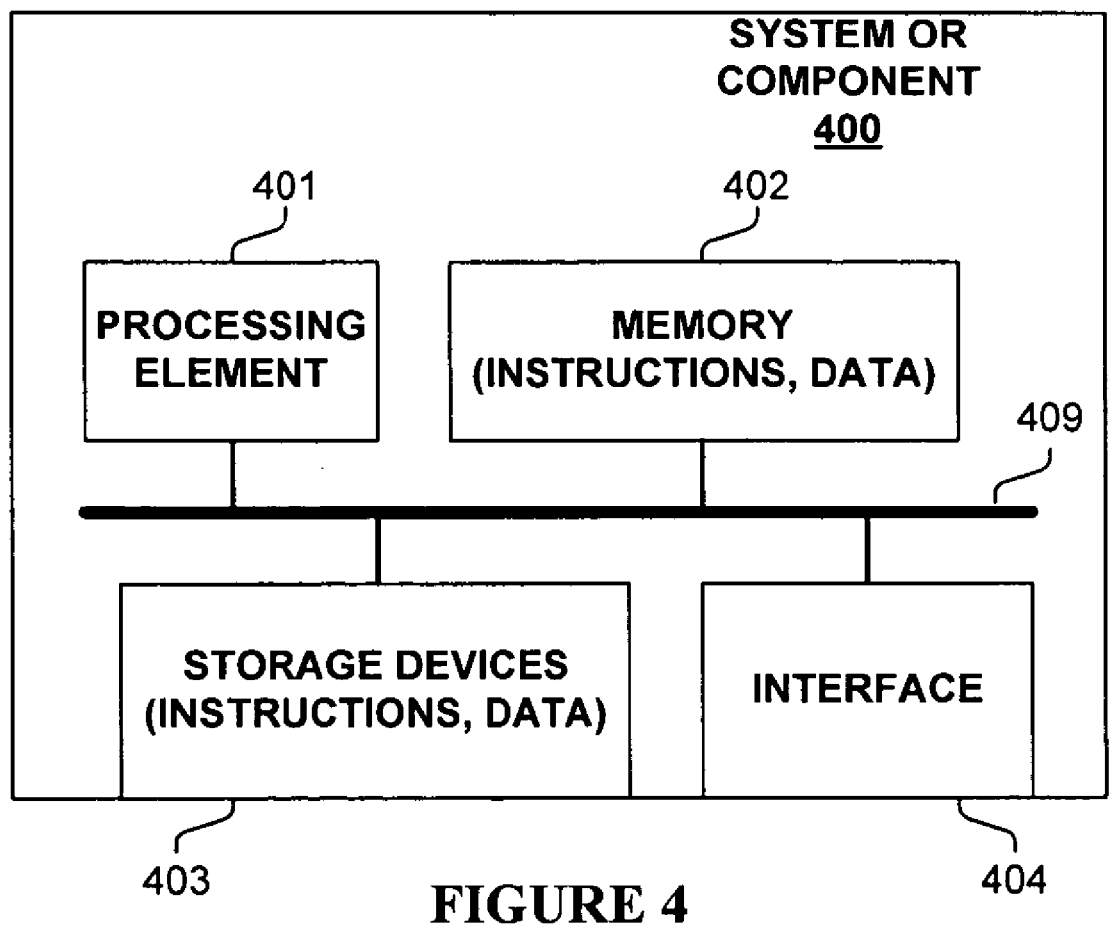
FIG. 4 is a block diagram of a schedule used in one embodiment.

FIG. 4 is a block diagram of an exemplary system or component 400 used in implementing a hierarchical schedule, whether the entire hierarchical schedule or just one or more of its schedules or schedule entries. In one embodiment, system or component 400 performs one or more processes corresponding to one of the flow diagrams illustrated or otherwise described herein.

In one embodiment, component 400 includes a processing element 401 (e.g., a processor, customized logic, etc.), memory 402, storage devices 403, and an interface 404 for receiving and sending packets, items, and/or other information, which are typically coupled via one or more communications mechanisms 409 (shown as a bus for illustrative purposes.) Various embodiments of component 400 may include more or less elements. The operation of component 400 is typically controlled by processing element 401 using memory 402 and storage devices 403 to perform one or more scheduling tasks or processes. Memory 402 is one type of computer-readable medium, and typically comprises random access memory (RAM), read only memory (ROM), flash memory, integrated circuits, and/or other memory components. Memory 402 typically stores computer-executable instructions to be executed by processing element 401 and/or data which is manipulated by processing element 401 for implementing functionality in accordance with the invention. Storage devices 403 are another type of computer-readable medium, and typically comprise solid state storage media, disk drives, diskettes, networked services, tape drives, and other storage devices. Storage devices 403 typically store computer-executable instructions to be executed by processing element 401 and/or data which is manipulated by processing element 401 for implementing functionality in accordance with the invention.

Figure 6A:
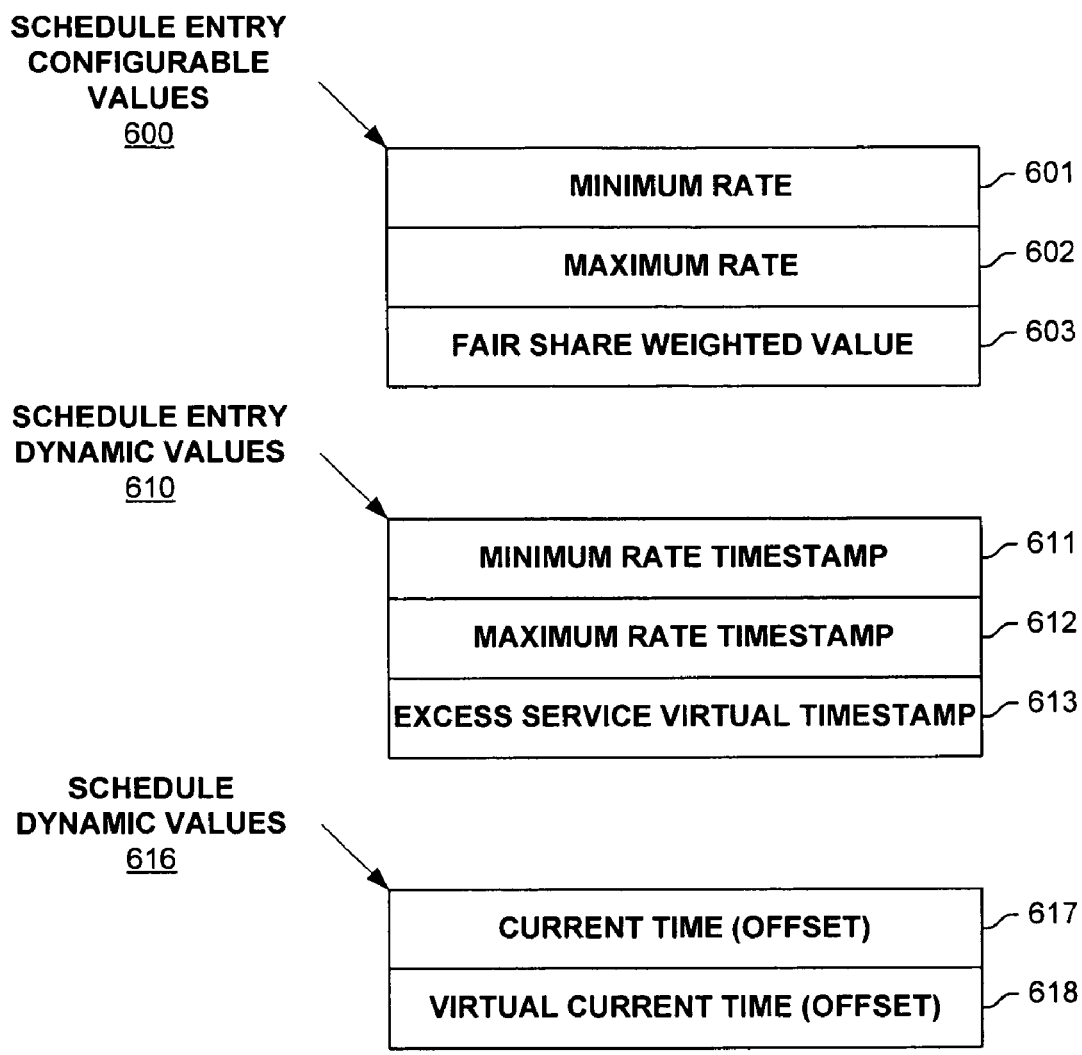
FIG. 6A is a block diagram illustrating values maintained in one embodiment.

FIG. 6A is a block diagram illustrating values maintained in one embodiment. Schedule entry configurable values 600 represent some examples of configuration parameters, which are typically static in nature (but may vary), and some schedule entry dynamic values 610. For example, one embodiment provides a minimum guaranteed scheduling rate service and excess rate service (e.g., for use in the periods in which all active schedule entries have been serviced at their guaranteed minimum rate). Thus, schedule entry configurable values 600 includes a minimum rate 601 (for guaranteed minimum rate scheduling), and a maximum rate 602 and a fair share weighed value 603 (for scheduling the excess rate traffic).

Schedule entry dynamic values 610 include a minimum rate timestamp 611, a maximum rate timestamp 612, and an excess service virtual timestamp 613 used in determining eligibility of the schedule entry for various types of service and in identifying the current best item from among the eligible items. In one embodiment, real and virtual times are maintained per schedule. Thus, schedule dynamic values 616 include a current time value 617 (which may be an offset value for deriving its current time value) typically used in conjunction with providing minimum guaranteed scheduling rate service, a virtual current time value 618 (which may also be an offset) typically used in conjunction with providing excess rate service.

Figure 6B:
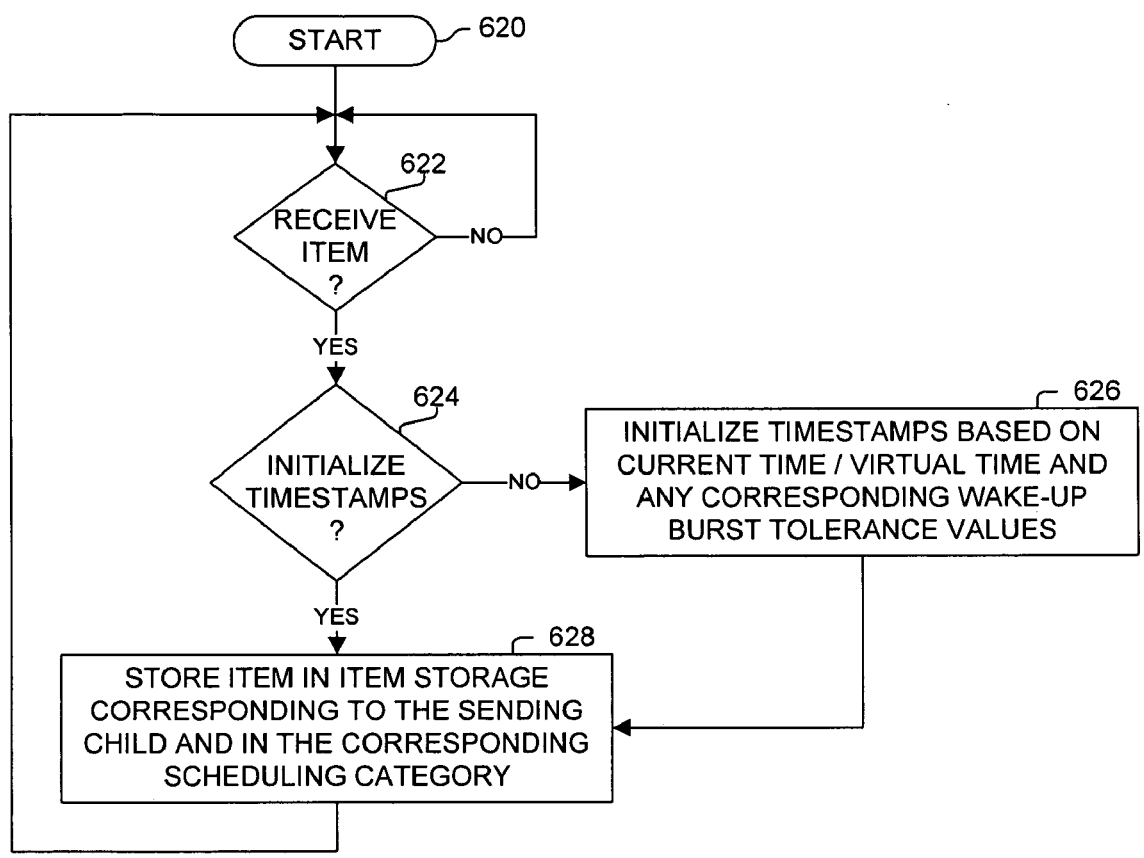
FIG. 6B is a flow diagram illustrating a process for initializing one or more timestamps as performed in one embodiment.

FIG. 6B is a flow diagram illustrating a process for initializing one or more timestamps in a schedule entry as performed in one embodiment. Processing begins with process block 620. As determined in process block 622, if an item is received, processing proceeds to process block 624, otherwise it waits at process block 622.

As determined in process block 624, if the timestamps of the schedule entry need to be initialized, such as, but not limited to becoming active after a period of dormancy, then in process block 626 one or more of the schedule entry's timestamps are initialized based on the current time and/or virtual time, and possibly with any corresponding wakeup burst tolerance values. By initializing a dormant schedule entry when it becomes active again, the scheduling values associated with the schedule entry typically do not need to be updated during its dormancy. Also, by initializing one or more timestamps associated with the schedule entry behind current time by some wakeup burst tolerance value, then the schedule entry will possibly be immediately eligible for multiple consecutive scheduling iterations (e.g., depending on the wakeup burst tolerance value, a rate associated with the schedule entry, and the amount of servicing of items associated with the schedule entry). Thus, in one embodiment, this mechanism provides compensation for periods of inactivity. In one embodiment, the wakeup burst tolerance value is a fixed value, possibly selected based on a priority and/or type of traffic associated with a schedule entry. In one embodiment, the wakeup burst tolerance value is a variable value (e.g., related to the term of the schedule entry's dormancy), possibly determined based on a priority and/or type of traffic associated with a schedule entry.

In process block 628, the received item is stored in item storage (e.g., in memory, in a queue, etc.). In one embodiment, the item is stored in a data structure corresponding to its scheduling category. In one embodiment used with a hierarchical schedule, this storage typically corresponding to the sending child schedule. Processing returns to process block 622.

Figure 6C:
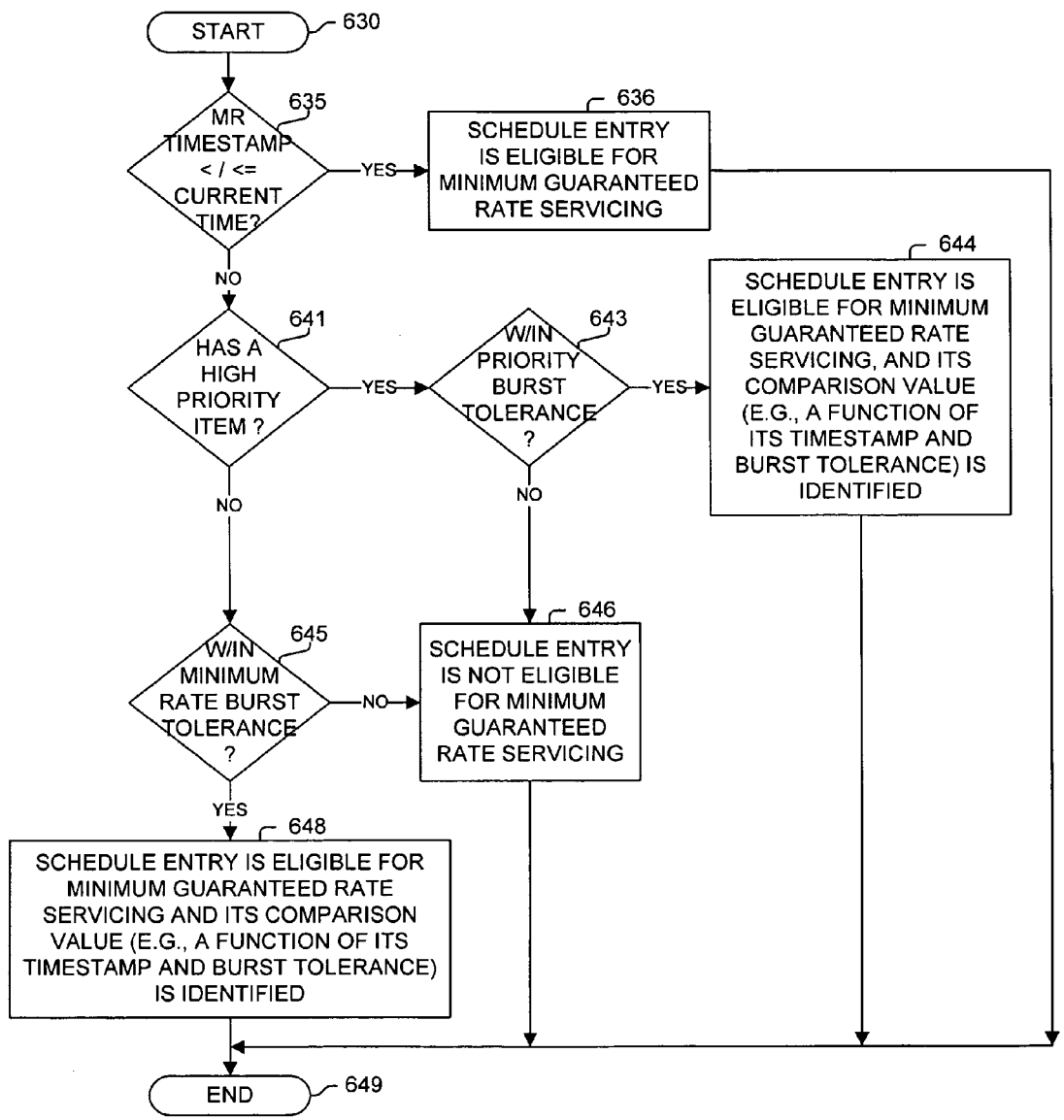
FIG. 6C is a flow diagram illustrating a process for determining eligibility of a schedule entry as performed in one embodiment.

FIG. 6C is a flow diagram illustrating a process for determining eligibility of a schedule entry for guaranteed minimum rate servicing as performed in one embodiment that services high priority items as part of its minimum guaranteed rate servicing. One embodiment, schedules high priority items separately, and thus might perform operations associated with process blocks 641 and 643 prior to checking for eligibility for minimum rate servicing. As apparent to one skilled in the art, many different embodiments are possible in keeping within the scope and spirit of the invention.

As shown in FIG. 6C, processing begins with process block 630. As determined in process block 635, if its minimum rate timestamp is less than or equal to the schedule entry's current time, then it is eligible for guaranteed minimum scheduling rate servicing (which may include servicing a high priority item) as indicated by process block 636. Otherwise, as determined in process block 641, if the schedule entry has a high priority item associated with it, then as determined in process block 643, if its minimum rate timestamp is within its corresponding high priority burst tolerance time bound, then it is eligible for guaranteed minimum scheduling rate servicing as indicated by process block 644, and its comparison value (e.g., its timestamp minus its burst tolerance value, its timestamp, etc.) is determined for use in identifying the best schedule item. Else it is not eligible as indicated by process block 646. (Note, if the high priority burst tolerance may be less than another burst tolerance value, processing typically will proceed from process block 643 to process block 645 instead of to process block 646). Otherwise, as determined in process block 645 (and if there is another burst tolerance time bound for non-high priority items), if its minimum rate timestamp is within a priority burst tolerance time bound, then it is eligible for guaranteed minimum scheduling rate servicing as indicated by process block 648, and its comparison value (e.g., its timestamp minus its burst tolerance value, its timestamp, etc.) is determined for use in identifying the best schedule item. Else it is not eligible as indicated by process block 646. Processing is complete as indicated by process block 649.

Figure 6D:
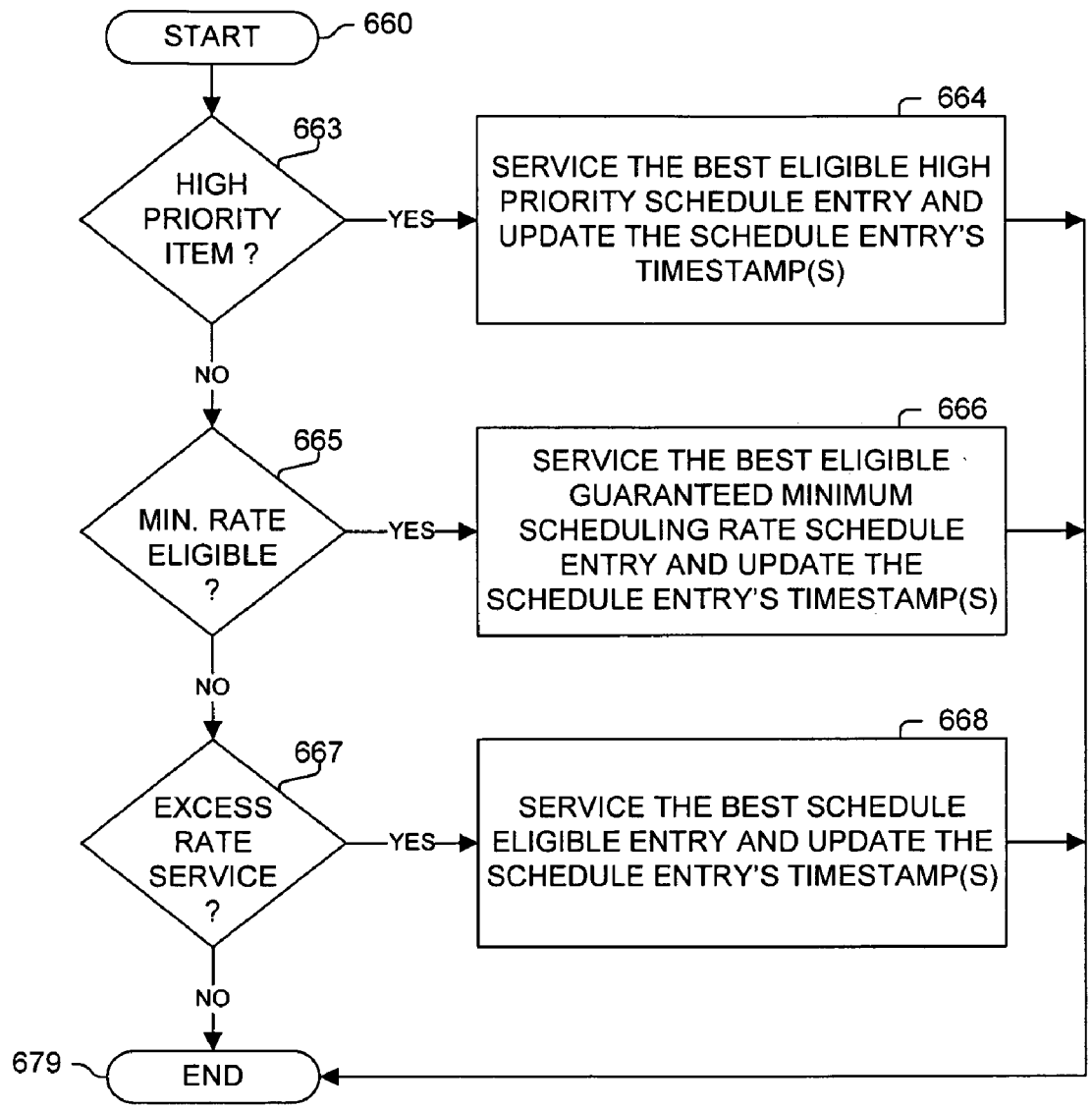
FIG. 6D is a flow diagram illustrating a process for determining a best schedule entry as performed in one embodiment.

FIG. 6D is a flow diagram illustrating a process for determining a best schedule entry as performed in one embodiment. Processing begins with process block 660. As determined in process block 663, if there are any schedule entries with high priority eligible items, then in process block 664, the best schedule entry of the eligible high priority schedule entries is serviced, and one or more of the schedule entry's timestamps (e.g., a minimum guaranteed scheduling rate timestamp, a maximum rate timestamp, an excess rate timestamp, etc.) are updated. As determined in process block 665, if there are any schedule entries eligible for minimum guaranteed scheduling rate service, then in process block 666, the best schedule entry of the eligible schedule entries is serviced, and one or more of the schedule entry's timestamps are updated. Otherwise, as determined in process block 667, if there is a schedule entry eligible for excess rate service (e.g., a schedule entry's excess timestamp is less than or equal to its virtual current time), then in process block 668, the best schedule entry of the eligible schedule entries is serviced, and one or more of the schedule entry's timestamps are updated. Processing is complete as indicated by process block 679.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for scheduling items, comprising:
identifying, by a particular apparatus configured for scheduling items, a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with a priority level of an item currently associated with said particular schedule entry;

wherein said associating the best schedule item with the schedule entry includes: identifying that the schedule entry was dormant prior to said associating, and in response, initializing one or more timestamps associated with the schedule entry; and wherein said initializing one or more timestamps includes setting a timestamp of said one or more timestamps prior to its associated current time by its nonzero wakeup burst tolerance value.

2. The method of claim 1, wherein the nonzero wakeup burst tolerance value is identified based on a priority associated with the timestamp.

3. A method for scheduling items, comprising:

identifying, by a particular apparatus configured for scheduling items, a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with a priority level of an item currently associated with said particular schedule entry;

wherein said associating the best schedule item with the schedule entry includes: identifying that the schedule entry was dormant prior to said associating, and in response, initializing one or more timestamps associated with the schedule entry; and wherein said one or more timestamps includes a plurality of timestamps; and wherein said initializing one or more timestamps includes setting each of the plurality of timestamps prior to its associated current time by its nonzero wakeup burst tolerance value.

4. The method of claim 3, wherein at least two of the plurality of timestamps have different said nonzero wakeup burst tolerance values.

5. A method for scheduling items, comprising:

identifying, by a particular apparatus configured for scheduling items, a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with a priority level of an item currently associated with said particular schedule entry; and in response to said identifying the best schedule item, updating said timestamp associated with said schedule entry associated with the best schedule item;

wherein said associating the best schedule item with the schedule entry includes: identifying that the schedule entry was dormant prior to said associating, and in response, initializing one or more timestamps associated with the schedule entry; and wherein a plurality of timestamps are associated with said schedule entry associated with the best schedule item, the plurality of timestamps including said timestamp and a maximum scheduling rate timestamp; and wherein the method includes also updating, in response to said identifying the best schedule item, said maximum scheduling rate timestamp associated with said schedule entry associated with the best schedule item.

6. A method for scheduling items, comprising:

identifying, by a particular apparatus configured for scheduling items, a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with a priority level of an item currently associated with said particular schedule entry; and in response to said identifying the best schedule item, updating said timestamp associated with said schedule entry associated with the best schedule item;

wherein said associating the best schedule item with the schedule entry includes: identifying that the schedule entry was dormant prior to said associating, and in response, initializing one or more timestamps associated with the schedule entry; and wherein a plurality of timestamps are associated with said schedule entry associated with the best schedule item, the plurality of timestamps including said timestamp, a maximum scheduling rate timestamp and an excess rate scheduling timestamp; and wherein the method includes also updating, in response to said identifying the best schedule item, said maximum scheduling rate and said excess rate scheduling timestamps associated with said schedule entry associated with the best schedule item.

7. The method of claim 6, wherein said schedule entry associated with the best schedule item is associated with a maximum excess rate burst tolerance value, and wherein said updating said excess rate scheduling timestamp does not allow said excess rate scheduling timestamp to exceed a current virtual time by the maximum excess rate burst tolerance value.

8. A method for scheduling items, comprising:

identifying, by a particular apparatus configured for scheduling items, a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with a priority level of an item currently associated with said particular schedule entry;

wherein each said timestamp is not allowed to be more than a maximum burst tolerance amount behind the current scheduling time.

9. A method for scheduling items, comprising:

identifying, by a particular apparatus configured for scheduling items, a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with a priority level of an item currently associated with said particular schedule entry; and updating the current scheduling time based on said timestamp of a schedule entry of the plurality of schedule entries and a minimum burst tolerance, wherein the minimum burst tolerance defines a maximum amount the current time can be ahead of said timestamp of the schedule entry.

10. The method of claim 9, comprising: in response to said identifying the best schedule item, associating the best schedule item with a schedule entry of a parent schedule of the schedule.

11. The method of claim 9, comprising: in response to said identifying the best schedule item, updating said timestamp associated with said schedule entry associated with the best schedule item.

12. The method of claim 11, wherein the best schedule item corresponds to the sending of a packet; and wherein said updating said timestamp includes adjusting said timestamp by an amount corresponding to the size of the packet and a rate associated with said schedule entry.

13. A method for scheduling items, comprising:
identifying, by a particular apparatus configured for scheduling items, a best schedule item associated with an eligible schedule entry of a plurality of schedule entries of a schedule, each of the plurality of schedule entries associated with one or more timestamps, said one or more timestamps including a minimum guaranteed scheduling rate timestamp, wherein whether or not a particular schedule entry of said schedule entries is eligible is determined based on the relationship of its associated said minimum guaranteed scheduling rate timestamp with a current scheduling time, said relationship including: if the particular schedule entry currently has associated therewith a high priority item, then the particular schedule entry's time range of eligibility includes its said associated minimum guaranteed scheduling rate timestamp being within a nonzero burst tolerance time bound after the current scheduling time and its said associated minimum guaranteed scheduling rate timestamp being equal or prior to the current schedule time.

14. The method of claim 13, including: in response to said identifying the best schedule item, associating the best schedule item with a schedule entry of a parent schedule of the schedule.

15. The method of claim 14, comprising: wherein said associating the best schedule item with the schedule entry includes: identifying that the schedule entry was dormant prior to said associating, and in response: initializing one or more timestamps associated with the schedule entry.

16. The method of claim 15, wherein said initializing one or more timestamps includes setting a timestamp of said one or more timestamps prior to its associated current time by its nonzero wakeup burst tolerance value.

17. The method of claim 16, wherein the nonzero wakeup burst tolerance value is identified based on a priority associated with the timestamp.

18. The method of claim 15, wherein said one or more timestamps includes a plurality of timestamps; and wherein said initializing one or more timestamps includes setting each of the plurality of timestamps prior to its associated current time by its nonzero wakeup burst tolerance value.

19. The method of claim 18, wherein at least two of the plurality of timestamps have different said nonzero wakeup burst tolerance values.

20. The method of claim 13, comprising: in response to said identifying the best schedule item, updating said minimum guaranteed scheduling rate timestamp associated with said schedule entry associated with the best schedule item.

21. The method of claim 20, wherein the best schedule item corresponds to the sending of a packet; and wherein said updating said timestamp includes adjusting said timestamp by an amount corresponding to the size of the packet and a rate associated with said schedule entry.

22. The method of claim 20, wherein said one or more timestamps includes a maximum scheduling rate timestamp; and wherein the method includes also updating, in response to said identifying the best schedule item, said maximum scheduling rate timestamp associated with said schedule entry associated with the best schedule item.

23. The method of claim 20, wherein said one or more timestamps includes a maximum scheduling rate timestamp and an excess rate scheduling timestamp; and wherein the method includes also updating, in response to said identifying the best schedule item, said maximum scheduling rate and said excess rate scheduling timestamps associated with said schedule entry associated with the best schedule item.

24. The method of claim 20, wherein a plurality of timestamps are associated with said schedule entry associated with the best schedule item, the plurality of timestamps including said timestamp and a maximum scheduling rate timestamp; and wherein the method includes also updating, in response to said identifying the best schedule item, said maximum scheduling rate timestamp associated with said schedule entry associated with the best schedule item.

25. The method of claim 20, wherein a plurality of timestamps are associated with said schedule entry associated with the best schedule item, the plurality of timestamps including said timestamp, a maximum scheduling rate timestamp and an excess rate scheduling timestamp; and wherein the method includes also updating, in response to said identifying the best schedule item, said maximum scheduling rate and said excess rate scheduling timestamps associated with said schedule entry associated with the best schedule item.

26. The method of claim 25, wherein said schedule entry associated with the best schedule item is associated with a maximum excess rate burst tolerance value, and wherein said updating said excess rate scheduling timestamp does not allow said excess rate scheduling timestamp to exceed a current virtual time by the maximum excess rate burst tolerance value.

27. An apparatus comprising one or more processors configured for performing operations for scheduling items, said operations comprising:
identifying a best schedule item associated with an eligible schedule entry of a plurality of schedule entries of a schedule, each of the plurality of schedule entries associated with one or more timestamps, said one or more timestamps including a minimum guaranteed scheduling rate timestamp, wherein whether or not a particular schedule entry of said schedule entries is eligible is determined based on the relationship of its associated said minimum guaranteed scheduling rate timestamp with a current scheduling time, said relationship including: if the particular schedule entry currently has associated therewith a high priority item, then the particular schedule entry's time range of eligibility includes its said associated minimum guaranteed scheduling rate timestamp being within a nonzero burst tolerance time bound after the current scheduling time and its said associated minimum guaranteed scheduling rate timestamp being equal or prior to the current schedule time.

28. The apparatus of claim 27, where said operations comprise: in response to said identifying the best schedule item, associating the best schedule item with a schedule entry of a parent schedule of the schedule.

29. The apparatus of claim 28, where said operations comprise: wherein said associating the best schedule item with the schedule entry includes: identifying that the schedule entry was dormant prior to said associating, and in response: initializing one or more timestamps associated with the schedule entry.

30. The apparatus of claim 29, wherein said initializing one or more timestamps includes setting a timestamp of said one or more timestamps prior to its associated current time by its nonzero wakeup burst tolerance value.

31. The apparatus of claim 30, wherein the nonzero wakeup burst tolerance value is identified based on a priority associated with the timestamp.

32. The apparatus of claim 29, wherein said one or more timestamps includes a plurality of timestamps; and wherein said initializing one or more timestamps includes setting each of the plurality of timestamps prior to its associated current time by its nonzero wakeup burst tolerance value.

33. The apparatus of claim 32, wherein at least two of the plurality of timestamps have different said nonzero wakeup burst tolerance values.

34. The apparatus of claim 27, where said operations comprise: in response to said identifying the best schedule item, updating said minimum guaranteed scheduling rate timestamp associated with said schedule entry associated with the best schedule item.

35. The apparatus of claim 34, wherein the best schedule item corresponds to the sending of a packet; and wherein said updating said timestamp includes adjusting said timestamp by an amount corresponding to the size of the packet and a rate associated with said schedule entry.

36. The apparatus of claim 34, wherein said one or more timestamps includes a maximum scheduling rate timestamp; and wherein said operations include: updating, in response to said identifying the best schedule item, said maximum scheduling rate timestamp associated with said schedule entry associated with the best schedule item.

37. The apparatus of claim 34, wherein said one or more timestamps includes a maximum scheduling rate timestamp and an excess rate scheduling timestamp; and wherein said operations include updating, in response to said identifying the best schedule item, said maximum scheduling rate and said excess rate scheduling timestamps associated with said schedule entry associated with the best schedule item.

38. The apparatus of claim 34, wherein a plurality of timestamps are associated with said schedule entry associated with the best schedule item, the plurality of timestamps including said timestamp and a maximum scheduling rate timestamp; and wherein said operations include updating, in response to said identifying the best schedule item, said maximum scheduling rate timestamp associated with said schedule entry associated with the best schedule item.

39. The apparatus of claim 34, wherein a plurality of timestamps are associated with said schedule entry associated with the best schedule item, the plurality of timestamps including said timestamp, a maximum scheduling rate timestamp and an excess rate scheduling timestamp; and wherein said operations include updating, in response to said identifying the best schedule item, said maximum scheduling rate and said excess rate scheduling timestamps associated with said schedule entry associated with the best schedule item.

40. The apparatus of claim 39, wherein said schedule entry associated with the best schedule item is associated with a maximum excess rate burst tolerance value, and wherein said updating said excess rate scheduling timestamp does not allow said excess rate scheduling timestamp to exceed a current virtual time by the maximum excess rate burst tolerance value.

41. A method for scheduling items, comprising: identifying, by a particular apparatus configured for scheduling items, a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with said particular schedule entry,
wherein the burst tolerance time bound allows the particular schedule entry to be considered as eligible based on its associated timestamp when normally it would not be considered as eligible by a scheduler because the timestamp associated with the particular schedule entry is after the current scheduling time.

42. The method of claim 41, wherein the burst tolerance time bound is a nonzero value associated with a priority level of the item currently associated with said particular schedule entry.

43. An apparatus for scheduling items, comprising: means for identifying a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with said particular schedule entry,
wherein the burst tolerance time bound allows the particular schedule entry to be considered as eligible based on its associated timestamp when normally it would not be considered as eligible by said means for identifying the best schedule item because the timestamp associated with the particular schedule entry is after the current scheduling time; and
wherein said means for identifying the best schedule item includes at least one hardware component.

44. The apparatus of claim 43, wherein the burst tolerance time bound is a nonzero value associated with a priority level of the item currently associated with said particular schedule entry.

45. An apparatus, comprising:
a scheduler, including one or more hardware components, configured for scheduling items;
wherein said scheduling items includes: identifying, by the scheduler, a best schedule item associated with an eligible schedule entry of a plurality of schedule entries in a schedule, wherein whether or not a particular schedule entry of said schedule entries is eligible is determined based on the relationship of its associated timestamp with a current scheduling time, said relationship including its said associated timestamp being within a burst tolerance time bound after the current scheduling time, wherein the burst tolerance time bound is a nonzero value associated with said particular schedule entry,
wherein the burst tolerance time bound allows the particular schedule entry to be considered as eligible based on its associated timestamp when normally it would not be considered as eligible by the scheduler because the timestamp associated with the particular schedule entry is after the current scheduling time.

46. The apparatus of claim 45, wherein the burst tolerance time bound is a nonzero value associated with a priority level of the item currently associated with said particular schedule entry.

* * * * *